(12) United States Patent
Park et al.

(10) Patent No.: US 12,173,957 B2
(45) Date of Patent: Dec. 24, 2024

(54) REFRIGERATOR

(71) Applicant: SAMSUNG ELECTRONICS CO., LTD., Suwon-si (KR)

(72) Inventors: Sungcheul Park, Suwon-si (KR); Hyuntae Ju, Suwon-si (KR); Jeongman Nam, Suwon-si (KR); Joongho Kim, Suwon-si (KR); Yonghyun Kang, Suwon-si (KR); Hunkwan Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 18/136,146

(22) Filed: Apr. 18, 2023

(65) Prior Publication Data
US 2023/0258391 A1 Aug. 17, 2023

Related U.S. Application Data

(63) Continuation of application No. PCT/KR2021/018890, filed on Dec. 13, 2021.

(30) Foreign Application Priority Data

Dec. 15, 2020 (KR) .................. 10-2020-0175230
Dec. 8, 2021 (KR) .................. 10-2021-0174451

(51) Int. Cl.
*F25D 23/06* (2006.01)
*F25D 23/02* (2006.01)

(52) U.S. Cl.
CPC ......... *F25D 23/064* (2013.01); *F25D 23/028* (2013.01); *F25D 2201/12* (2013.01)

(58) Field of Classification Search
CPC .... B65D 2585/6817; B65D 2585/6812; B65D 81/18; B65D 88/74; F25D 23/064;
(Continued)

(56) References Cited

U.S. PATENT DOCUMENTS 6,460,955 B1  10/2002  Vaughan et al.
8,037,708 B2  10/2011  Cho et al.
(Continued)

FOREIGN PATENT DOCUMENTS

CN  101532764 A  9/2009
CN  106500428 B  2/2019
(Continued)

OTHER PUBLICATIONS

Extended European Search Report issued in counterpart European Application No. 21907025.7 dated Feb. 9, 2024.
(Continued)

*Primary Examiner* — Kareen K Thomas
(74) *Attorney, Agent, or Firm* — STAAS & HALSEY LLP

(57) ABSTRACT

A refrigerator includes: an inner case as assembled by a plurality of plates including an upper plate, a lower plate, a left plate, a right plate, and a rear plate, configured so that, while they are assembled with each other, form a storage compartment. At least one among the plurality of plate is injection molded. The refrigerator also includes an outer case configured to be coupleable to an outside of the inner case to form an external appearance; and a heat insulating material disposed between the inner case and the outer case. The at least one injection molded plate among the upper plate, the lower plate, the left plate, and the right plate includes a front flange integrally formed at a front side of the at least one injection molded plate, and the outer case is configured to be coupleable to the front flange.

15 Claims, 31 Drawing Sheets

(58) Field of Classification Search
CPC .. F25D 23/028; F25D 2201/12; F25D 23/066; F25D 23/063; B29C 45/14
See application file for complete search history.

(56) References Cited

U.S. PATENT DOCUMENTS

| | | | |
|---|---|---|---|
| 9,810,477 | B2 | 11/2017 | Sul et al. |
| 10,775,098 | B2 | 9/2020 | Lim et al. |
| 10,907,885 | B2 | 2/2021 | Jung et al. |
| 2011/0146054 | A1 | 6/2011 | Selin et al. |
| 2016/0282035 | A1 | 9/2016 | Sul et al. |
| 2020/0113332 | A1* | 4/2020 | Jeong ............ F24C 15/08 |
| 2020/0124343 | A1* | 4/2020 | Hunter ........... F25D 23/067 |
| 2020/0158399 | A1* | 5/2020 | Kim ............... F25C 1/04 |
| 2020/0158417 | A1* | 5/2020 | Bechtle .......... G03B 15/00 |
| 2020/0224815 | A1* | 7/2020 | Jung ............. F25D 23/065 |
| 2022/0099358 | A1 | 3/2022 | Jung et al. |

FOREIGN PATENT DOCUMENTS

| | | |
|---|---|---|
| CN | 110140019 A | 8/2019 |
| CN | 212902196 U | 4/2021 |
| JP | 56-161485 | 12/1981 |
| JP | 7-29190 | 7/1995 |
| JP | 8-82475 | 3/1996 |
| JP | 2001-272154 | 10/2001 |
| JP | 2003-70579 | 3/2003 |
| JP | 2005-90845 | 4/2005 |
| JP | 2009-115368 | 5/2009 |
| JP | 4277675 | 6/2009 |
| JP | 5460817 | 4/2014 |
| JP | 2016-217704 | 12/2016 |
| JP | 6275530 | 2/2018 |
| JP | 6803824 | 12/2020 |
| JP | 6857227 | 4/2021 |
| KR | 1999-004042 | 1/1999 |
| KR | 2000-0011242 | 6/2000 |
| KR | 2001-0023799 | 3/2001 |
| KR | 20-0267237 | 3/2002 |
| KR | 10-2005-0026244 | 3/2005 |
| KR | 10-0763853 | 10/2007 |
| KR | 10-2009-0105331 | 10/2009 |
| KR | 10-2011-0068952 | 6/2011 |
| KR | 10-2013-0055001 | 5/2013 |
| KR | 10-1341503 | 12/2013 |
| KR | 10-1608503 | 4/2016 |
| KR | 10-2016-0115056 | 10/2016 |
| KR | 10-2016-0115445 | 10/2016 |
| KR | 10-2018-0066497 | 6/2018 |
| KR | 10-2018-0080054 | 7/2018 |
| KR | 10-2018-0080082 | 7/2018 |
| KR | 10-2020-0095867 | 8/2020 |
| KR | 10-2243486 | 4/2021 |

OTHER PUBLICATIONS

International Search Report dated Apr. 13, 2022 issued in PCT Application No. PCT/KR2021/0188910.
Written Opinion dated Apr. 13, 2022 issued in PCT Application No. PCT/KR2021/0188910.

* cited by examiner

REFRIGERATOR

CROSS-REFERENCE TO RELATED APPLICATIONS

This application is a continuation application of International Application No. PCT/KR2021/018890, filed Dec. 13, 2021, which claims priority to Korean Patent Application Nos. 10-2020-0175230, filed Dec. 15, 2020, and 10-2021-0174451, filed Dec. 8, 2021, the disclosures of which are each hereby incorporated by reference herein in their entirety.

BACKGROUND

1. Field

The present disclosure relates to a refrigerator having a prefabricated inner case.

2. Description of Related Art

A refrigerator is an appliance equipped with a main body having a storage compartment and a cold air supply system for supplying cold air to the storage compartment to keep foodstuffs in a fresh state. The storage compartment includes a refrigerating compartment maintained at about 0° C. to 5° C. to refrigerate and store food, and a freezing compartment maintained at about 0° C. to 30° C. to freeze and store food.

The main body of the refrigerator is provided by coupling an inner case and an outer case to each other. The inner case forms the storage compartment, and the outer case forms the exterior of the refrigerator. A heat insulating material for heat insulation is disposed between the inner case and the outer case. The storage compartment of the refrigerator is provided to have a front side that is open, and the open front side is closed by a door to maintain the temperature of the storage compartment.

In general, the inner case of a refrigerator is formed a vacuum forming method in which a sheet of resin material is heated, the stretched sheet is placed on a mold, and air is suctioned from the opposite side of the mold for the heated sheet to be covered on the mold or suctioned and introduced into the mold by the suction force.

Materials of Inner cases formed by a vacuum forming method are limited to resin materials. A method of processing an inner case by a vacuum forming method and then attaching a metal plate to the inside of the inner case is also being used, but even in this case, it is restricted in in the type, thickness, load and the like of bondable materials because the method requires adhesion of the metal plate to the inside of the inner case.

SUMMARY

A refrigerator according to an embodiment of the present disclosure includes an inner case assembled by a plurality of plates including an upper plate, a lower plate, a left plate, a right plate, and a rear plate, configured so that, while assembled with each other form a storage compartment, at least one plate among the plurality of plates is injection molded. The refrigerator also includes an outer case configured to be coupleable to an outside of the inner case to form an external appearance; and a heat insulating material disposed between the inner case and the outer case. At least one injection molded plate among the upper plate, the lower plate, the left plate, and the right plate includes a front flange integrally formed at a front side of the at least one injection molded plate, and the outer case is configured to be coupleable to the front flange.

Each of the upper plate and the lower plate may be provided with a plurality of first protrusion portions on left, right, and rear side edges, so as to be configured to allow the left plate, the right plate, and the rear plate to be assembled with the upper plate and the lower plate.

Each of the left plate and the right plate may be provided with a plurality of first concave portions on upper and lower side edges, so as to be configured to be assembled with the plurality of first protrusion portions on the left, right, and rear side edges of the upper plate and the lower plate.

Each of the left plate and the right plate may be provided with a plurality of second protrusion portions a on rear side edge, so as to be configured to be assembled with the rear plate.

The rear plate may be provided with a plurality of second concave portions on each side edge, so as to be configured to be assembled with the plurality of first protrusion portions formed on the rear side edges of the upper plate and the rear side edge of the lower plate and the plurality of second protrusions formed on the rear side edges of the left plate and the rear side edge of the right plate.

The upper plate and the right plate are configured so that, while the upper plate is assembled to the right plate, the upper plate assembled to the right plate is stackable and storable with a plurality of other upper plates assembled to other right plates.

The lower plate and the left plate are configured so that, while the lower plate is assembled to the left plate, the lower plate assembled to the left plate is stackable and storable with a plurality of other lower plates assembled to other left plates.

The plurality of first protrusion portions on the left side edge of the upper plate may be configured to be assembled with the plurality of first concave portions on the upper side edge of the left plate, and the plurality of first protrusion portions on the right side edge of the lower plate may be configured to be assembled with the plurality of first concave portions on the lower side edge of the right plate, to allow the upper plate, the lower plate, the left plate, and the right plate be assembled with each other.

The plurality of first protrusion portions on the rear side edges of the upper plate and the lower plate and the plurality of second protrusion portions on the rear side edges of the left plate and the right plate may be configured to be assembled with the plurality of second concave portions on the rear plate, to allow the rear plate to be assembled with the upper plate, the lower plate, the left plate, and the right plate.

A first side of the upper plate is configured to be hinge-assembled with the left plate or the right plate, and a second side opposite the first side of the upper plate may be configured to be hook-assembled with the left plate or the right plate.

A second side of the lower plate opposite to the first side of the upper plate may be configured to be hinge-assembled with the left plate or the right plate, and a first side of the lower plate may be configured to be hook-assembled with the left plate or the right plate.

The upper plate, the lower plate, the left plate, and the right plate may be configured to be hook-assembled with the rear plate The inner case, while assembled, may include adjacent surfaces that include a protrusion portion that protrudes from one side the inner case, and the rear plate are assembled to each other, and a groove portion formed as a recession in an other side to accommodate the protrusion portion.

The inner case, while assembled, includes a heat insulating material storage portion configured to store the heat insulating material, wherein the heat insulating material storage portion may be located on a path through which a part of the heat insulating material foamed between the inner case and the outer case infiltrates into the storage compartment to prevent the heat insulating material from infiltrating into the storage compartment.

The rear plate may be provided with an evaporator installation portion configured to accommodate installation of an evaporator, and a drain member detachably coupled to a lower portion of the evaporator installation portion, the drain member configured to drain condensate from the evaporator.

Also, a refrigerator according to an embodiment of the present disclosure includes: an inner case composed of an upper plate, a lower plate, a left plate, a right plate, and a rear plate, which are separated from each other, and including a first inner case forming a refrigerating compartment and a second inner case forming a freezing compartment located on a lower side of the refrigerating compartment; an outer case coupled to an outer case to form an external appearance; and a heat insulating material disposed between the inner case and the outer case, wherein at least one of the upper plate, the lower plate, the left plate, the right plate, or the rear plate is injection molded to form a pattern on a surface thereof.

A distance between the second inner case and the outer may be greater than a distance between the first inner case and the outer case, and an extension panel extending in parallel from a lower portion of the first inner case in a direction toward the second inner case may be integrally formed with the inner case to minimize a difference in insulation thicknesses at a boundary part between the first inner case and the second inner case.

The extension panel may be disposed between the outer case and the second inner case, and may include a plurality of holes through which the heat insulating material may pass so that the heat insulating material may be disposed both between the extension panel and the outer case and between the extension panel and the second inner case.

Also, a refrigerator according to an embodiment of the present disclosure includes: an inner case composed of an upper plate, a lower plate, a left plate, a right plate, and a rear plate, which are separated from each other, and including a first inner case forming a refrigerating compartment and a second inner case forming a freezing compartment located on a lower side of the refrigerating compartment; an outer case coupled to an outer case to form an external appearance; and a heat insulating material disposed between the inner case and the outer case, wherein the inner case is integrally injection molded with a rail on which a storage container is slidably supported.

Also, a refrigerator according to an embodiment of the present disclosure includes: an inner case composed of an upper plate, a lower plate, a left plate, a right plate, and a rear plate, which are separated from each other, and including a first inner case forming a refrigerating compartment and a second inner case forming a freezing compartment located on a lower side of the refrigerating compartment; an outer case coupled to an outer case to form an external appearance; and a heat insulating material disposed between the inner case and the outer case, wherein the inner case is integrally injection molded with a case lamp on which a light emitting diode is mounted.

Also, a refrigerator according to an embodiment of the present disclosure includes: an inner case composed of an upper plate, a lower plate, a left plate, a right plate, and a rear plate, which are separated from each other, and including a first inner case forming a refrigerating compartment and a second inner case forming a freezing compartment located on a lower side of the refrigerating compartment; an outer case coupled to an outer case to form an external appearance; and a heat insulating material disposed between the inner case and the outer case, wherein the inner case is integrally injection molded with an evaporator fixture to which an evaporator is fixed.

Also, a refrigerator according to an embodiment of the present disclosure includes: an inner case composed of an upper plate, a lower plate, a left plate, a right plate, and a rear plate, which are separated from each other, and including a first inner case forming a refrigerating compartment and a second inner case forming a freezing compartment located on a lower side of the refrigerating compartment; an outer case coupled to an outer case to form an external appearance; and a heat insulating material disposed between the inner case and the outer case, wherein the refrigerating compartment is closed by a pair of refrigerating compartment doors rotatably coupled to a front side of the refrigerating compartment, and the inner case is integrally injection molded with a rotation guide for guiding rotation of a rotating bar, which is rotatably coupled to one of the pair of refrigerating compartment doors 31 so as to be located between the pair of refrigerating compartment doors when the pair of refrigerating compartment doors are closed.

DETAILED DISCLOSURE

Figure 1:
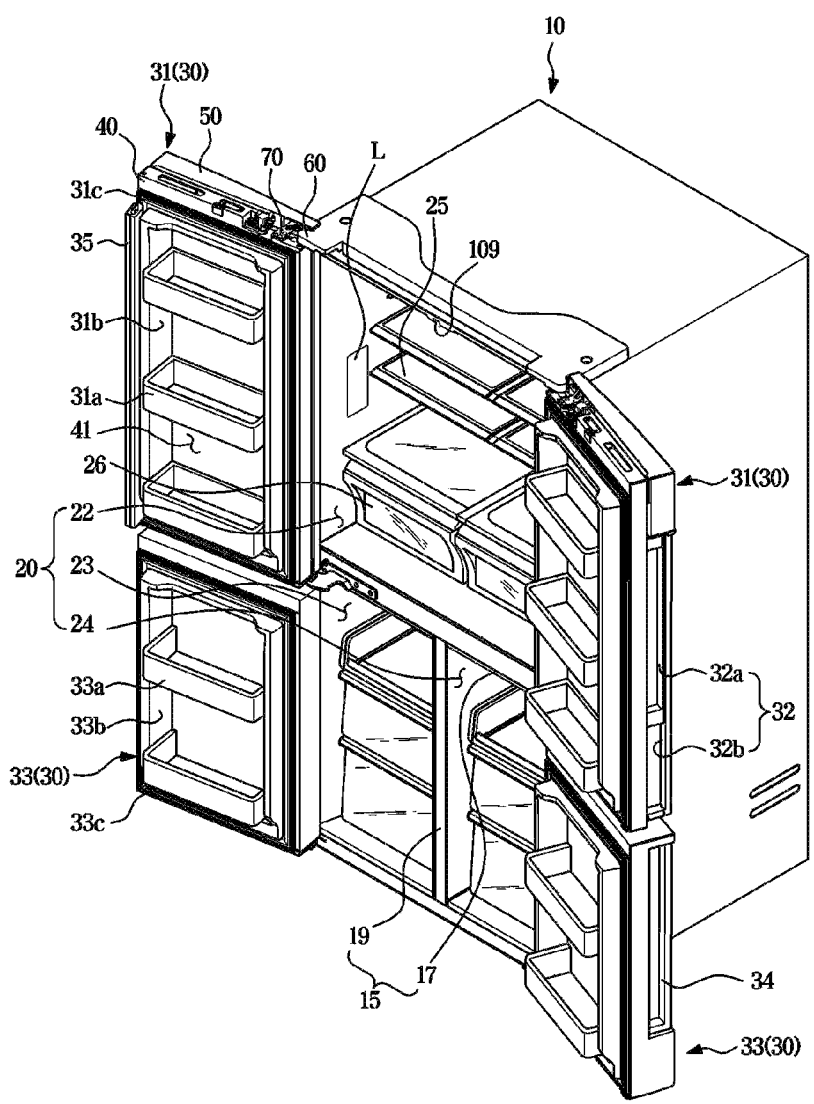
FIG. 1 may be a view illustrating a front side of a refrigerator according to an embodiment of the present disclosure, showing a state in which first doors and second doors are open together.

Embodiments described in the specification and configurations shown in the accompanying drawings may be merely exemplary examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein may be only for the purpose of describing particular embodiments and may be not intended to limit and/or restrict the present disclosure. The singular form may be intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements may be not limited by the terms, and the terms may be only used to distinguish one element from another. For example, a first element could be termed a second element, and similarly, a second element could be termed a first element without departing from the scope of the present disclosure. The term "and/or" includes combinations of one or all of a plurality of associated listed items.

Meanwhile, the terms "front", "rear", "upper", "lower", "front", "rear", "top" and "bottom" used in the following description may be defined based on drawings, and the shape and position of each component may be not limited by the terms.

Hereinafter, embodiments according to the disclosure will be described in detail with reference to the accompanying drawings.

One aspect of the disclosure provides a refrigerator in which an inner case is composed of split parts so that the volume of the refrigerator during loading/storage is reduced, thereby enabling a large number of refrigerators to be stored in the same space and enabling a large number of refrigerators to be transported at one time.

According to embodiments of the present disclosure, a large number of refrigerators can be stored even in a small space, thereby reducing logistics costs.

In addition, a large number of refrigerators can be transported at one time, thereby reducing transportation costs.

Figure 2:
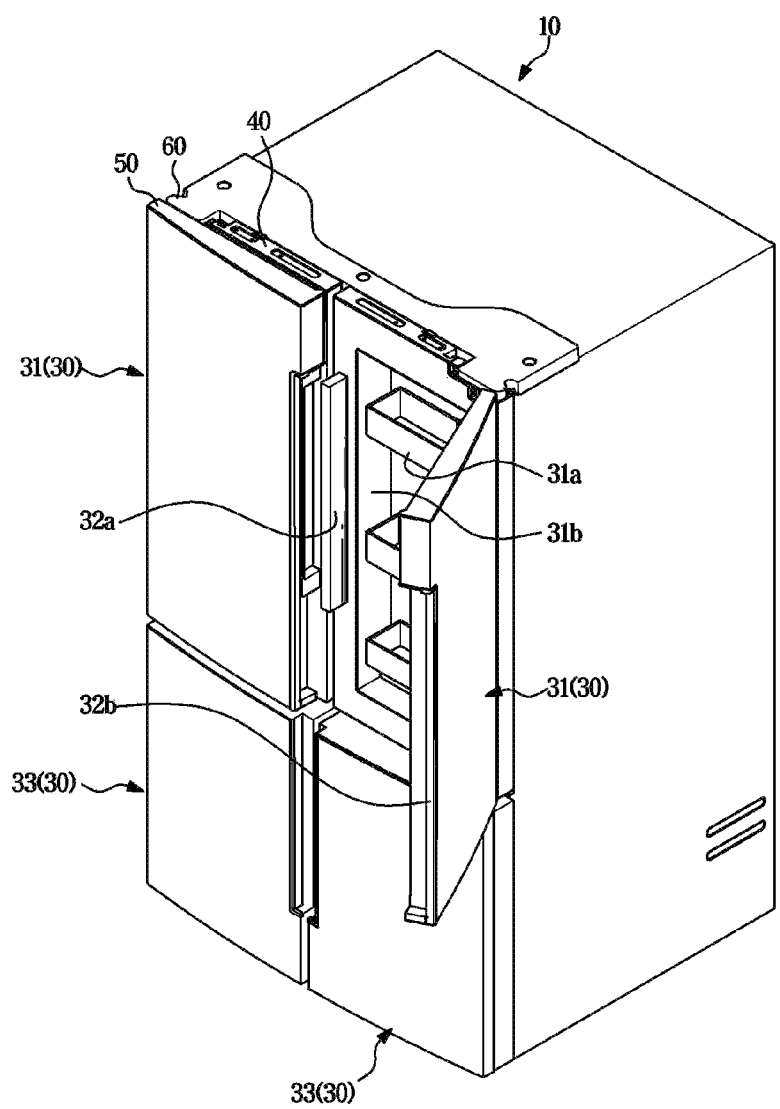
FIG. 2 may be a view illustrating a state in which one of the second doors of the refrigerator shown in FIG. 1 is open.
Figure 3:
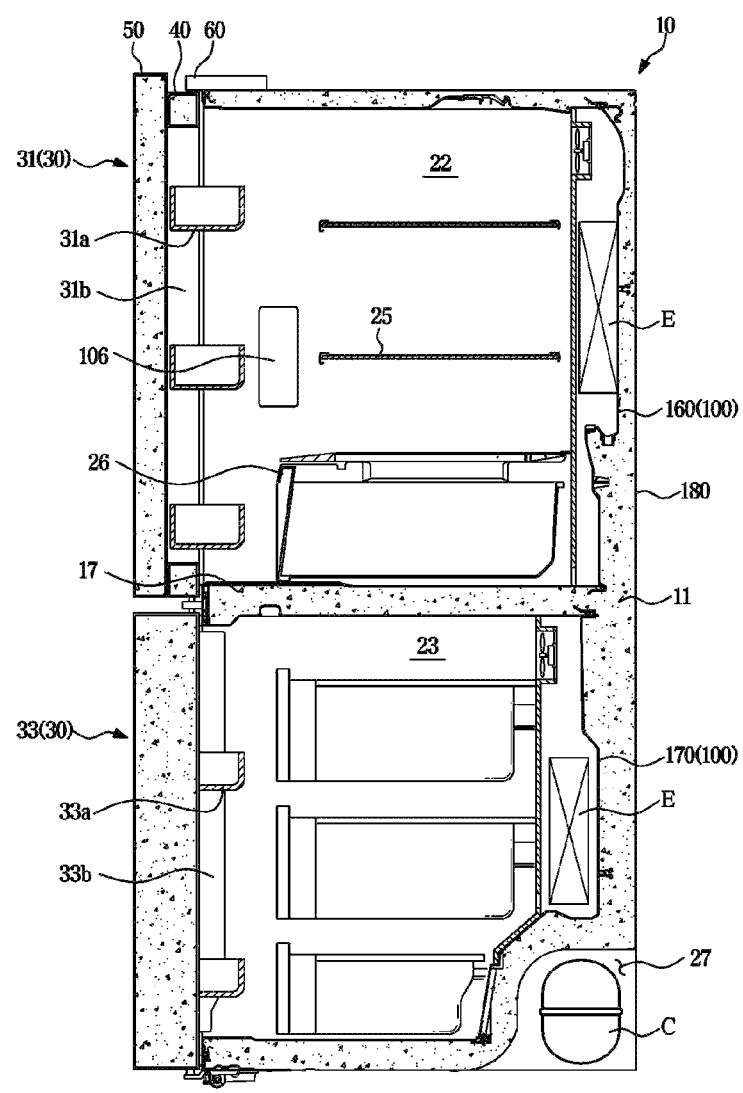
FIG. 3 is a schematic side cross-sectional view illustrating a refrigerator according to an embodiment of the present disclosure.

FIG. 1 may be a view illustrating a front side of a refrigerator according to an embodiment of the present disclosure, showing a state in which first doors and second doors are open together. FIG. 2 may be a view illustrating a state in which one of the second doors of the refrigerator shown in FIG. 1 is open. FIG. 3 is a schematic side cross-sectional view illustrating a refrigerator according to an embodiment of the present disclosure.

Referring to FIGS. 1 to 3, a refrigerator includes a main body 10, a storage compartment 20 vertically divided inside the main body 10, a door 30 opening and closing the storage compartment 20, and a cold air supply device (not shown) supplying cold air to the storage compartment 20.

The main body 10 may include an inner case 100 forming the storage compartment 20, an outer case 180 coupled to the outside of the inner case 100 to form an exterior, and a heat insulating material 11 foamed between the inner case 100 and the outer case 180 to include the storage compartment 20.

A machine room 27 in which a compressor C for compressing a refrigerant and a condenser (not shown) for condensing the refrigerant compressed by the compressor C may be installed may be provided at a lower rear side of the main body 10.

The cold air supply device may include a compressor C for compressing the refrigerant, a condenser (not shown) for condensing the refrigerant, an expansion valve (not shown) for expanding the refrigerant, and an evaporator E for evaporating the refrigerant.

The storage compartment 20 may be divided into a plurality of storage compartments by a partition 15, and a plurality of shelves 25 and storage containers 26 may be provided inside the storage compartment 20 to store food and the like.

The storage compartment 20 may be divided into a plurality of storage compartments 22, 23, and 24 by a partition 15, and the partition 15 may include a first partition 17 horizontally coupled to the inside of the storage compartment 20 to divide the storage compartment 20 into an upper storage compartment 22 and lower storage compartments 23 and 24, and a second partition 19 vertically coupled to the lower storage compartments 23 and 24 to divide the lower storage compartments 23 and 24 into a first storage compartment 23 and a second storage compartment 23.

The partition 15 having a T shape by combination of the first partition 17 and the second partition 19 may divide the storage compartment 20 into three spaces. Among the upper storage compartment 22 and the lower storage compartments 23 and 24 divided by the first partition 17, the upper storage compartment 22 may be used as a refrigerating compartment, and the lower storage compartments 23 and 24 may be used as freezing compartments.

All of the lower storage compartments 23 and 24 may be used as freezing compartments, but the first storage compartment 23 may be used as a freezing compartment while the second storage compartment 24 may be used as a refrigerating compartment, or the first storage compartment 23 may be used as a freezing compartment and the second storage compartment 24 may be used as either a freezing compartment or a refrigerating compartment.

Division of the storage compartment 20 as described above may be an example, and each of the storage compartments 22, 23, and 24 may be used differently from the above configuration.

The refrigerating compartment 22 and the freezing compartments 23 and 24 may be opened and closed by doors 30 rotatably coupled to the main body 10, respectively.

The door 30 includes a pair of refrigerating compartment doors 31 rotatably coupled to the main body 10 to open and close the refrigerating compartment 22 and a pair of freezing compartment doors 33 rotatably coupled to the main body 10 to open and close the freezing compartments 23 and 24.

The pair of refrigerating compartment doors 31 may be opened and closed through a pair of refrigerating compartment door handles 32 including a first door handle 32a or a second door handle 32b. The refrigerating compartment 22 may be opened and closed by the pair of refrigerating compartment doors 31, and may be provided with a rotating bar 35 on at least one of the pair of refrigerating compartment doors 31 to prevent a gap between the pair of refrigerating compartment doors 31 from occurring when the pair of refrigerating compartment doors 31 are closed. The rotating bar 35 may be rotatably coupled to at least one of the pair of refrigerating compartment doors 31. The rotating bar 35 may be guided to rotate according to the opening and closing of the refrigerating compartment door 31 by a rotation guide 109 formed on the inner case 100.

The pair of freezing compartment doors 33 may be opened and closed respectively by freezing compartment door handles 34. A sliding door may be used for the door that opens and closes the freezing compartments 23 and 24.

Door shelves 31a and 33a for storing food may be provided on rear surfaces of the pair of refrigerating compartment doors 31 and the pair of freezing compartment doors 33, respectively.

The door shelves 31a and 33a may include shelf support portions 31b and 33b, respectively, each of which is formed to vertically extend from a respective one of the doors 31 and 33 and support a respective one of the door shelves 31a and 33a on both left and right sides of the respective one of the door shelves 31a and 33a. The shelf support portions 31b and 33b may be provided to extend from the respective doors 31 and 33. The shelf supports 31b and 33b may be detachably provided to the respective doors 31 and 33 as separate configurations.

In addition, at the rims of the rear surfaces of the respective doors 31 and 33, first gaskets 31c and 33c may be provided to seal a gap with respect to the main body 10 in a state in which the respective doors 31 and 33 are closed. The first gaskets 31c and 33c may be installed in a shape of a loop along the rims of the rear surfaces of the respective doors 31 and 33, and magnets (not shown) may be included at an inside of the first gaskets 31c and 33c.

The pair of refrigerating compartment doors 31 that open and close the refrigerating compartment 22 may be disposed to left and right of each other. Hereinafter, for the sake of convenience of description, only the refrigerating compartment door 31 disposed on the left side of the drawing will be described, and the refrigerating compartment door 31 disposed on the left side of the drawing will be referred to as the refrigerating compartment door 31. However, the refrigerating compartment door 31 described below may be not limited to the refrigerating compartment door 31 disposed on the left side of the drawing, but may also be applied to the refrigerating compartment door 31 disposed on the right side of the drawing, and may be applied to at least one of the pair of freezing compartment doors 33.

The refrigerating compartment door 31 may be provided as a double door including a first door 40 and a second door 50.

The first door 40 may be rotatably connected to the main body 10 by a first hinge 60 and may open and close the refrigerating compartment 22. The door shelf 31a, the shelf support portion 31b, and the first gasket 31c described above may be provided on the first door 40.

The first door 40 may include an opening 41 formed such that a user may access the door shelf 31a and take in or take out food in a closed state of the first door 40. The opening 41 may be formed to pass through the first door 40 and may be opened and closed by the second door 50.

The second door 50 may be provided in front of the first door 40 to open and close the opening 41 of the first door 40, and may be provided to be rotatable in the same direction as the first door 40. In the drawings, the second door 50 is illustrated as being supported by a second hinge 70 installed on the first door 40 and rotatable with respect to the first door 40, but it is not limited thereto, and the second door 50 may also be provided to be rotatable with respect to the main body 10 as the second hinge 70 is installed on the main body 10.

The second door 50 may include a second gasket (not shown) for maintaining airtightness with respect to the first door 40. The second gasket may be installed in a shape of a loop along the rim of the rear surface of the second door 50, and a magnet (not shown) may be included in the second gasket.

Figure 4:
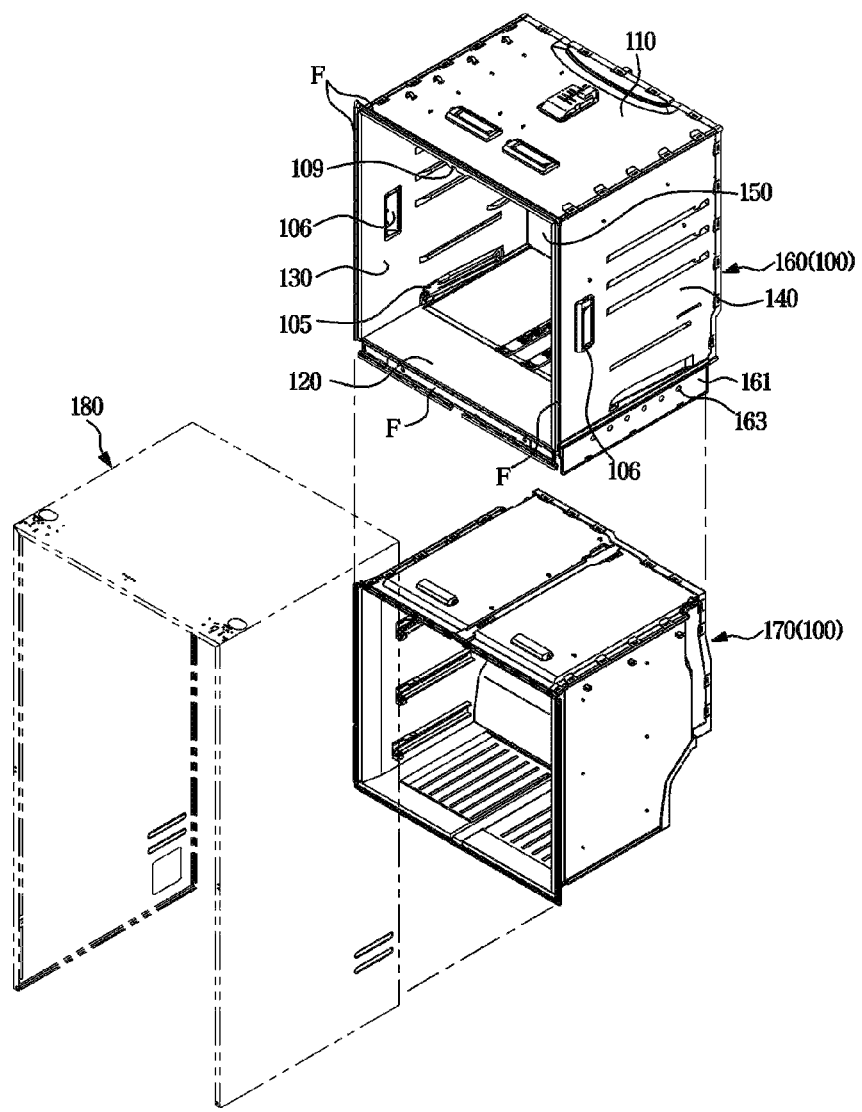
FIG. 4 is a view illustrating a state in which an inner case and an outer case are separated from each other according to an embodiment of the present disclosure.
Figure 5:
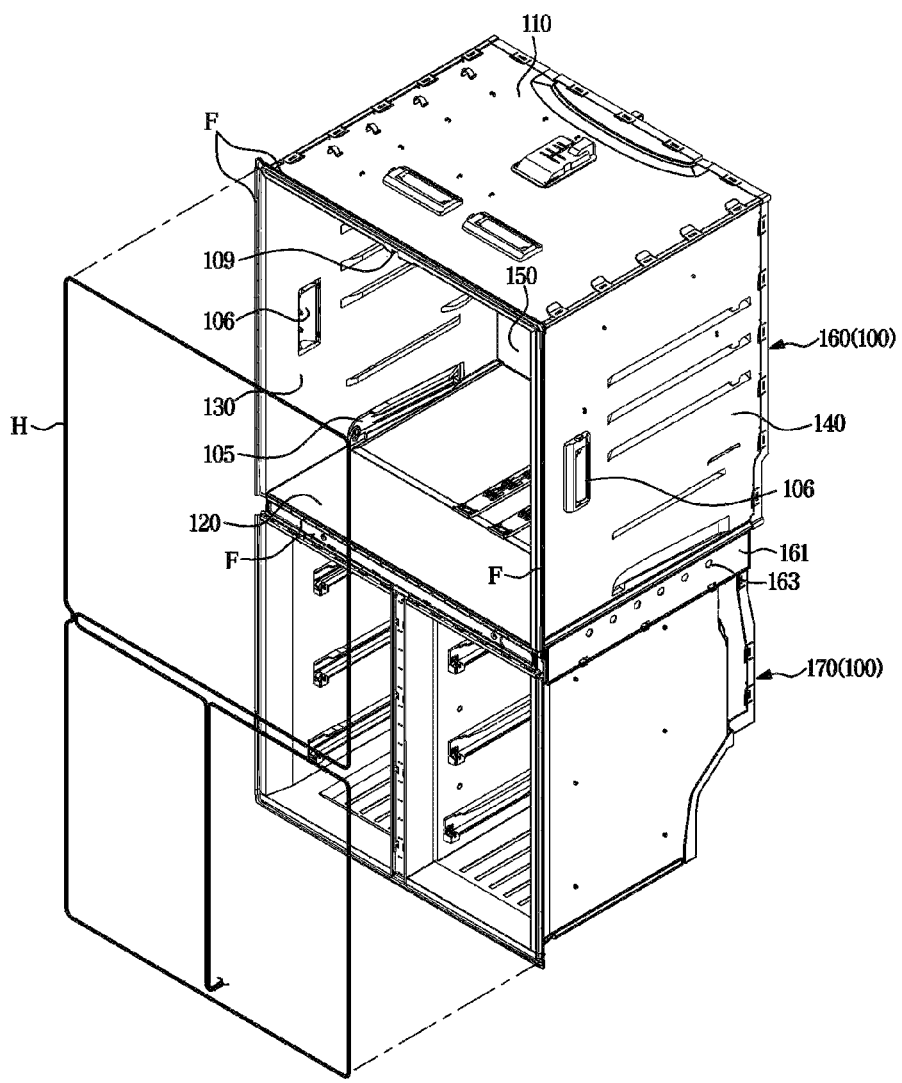
FIG. 5 is a view illustrating a process in which a hot pipe is seated on a front flange of an inner case according to an embodiment of the present disclosure.
Figure 6:
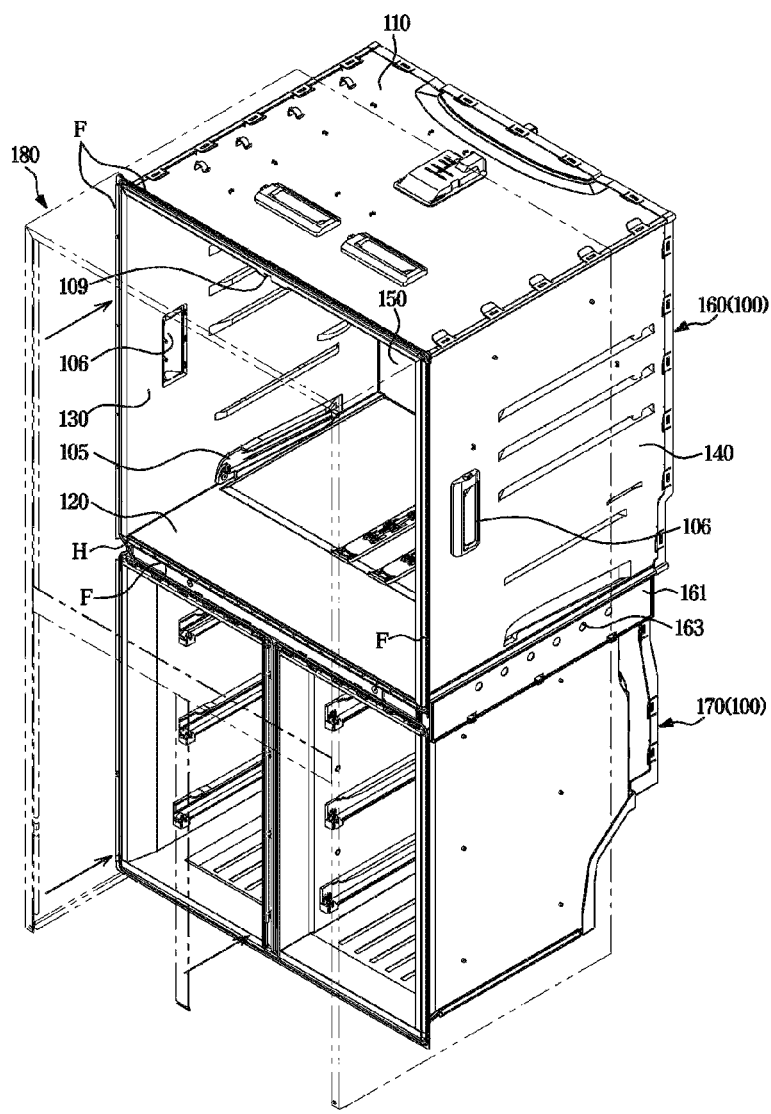
FIG. 6 is a view illustrating a state in which a hot pipe is seated on a front flange of an inner case according to an embodiment of the present disclosure.

FIG. 4 is a view illustrating a state in which an inner case and an outer case are separated from each other according to an embodiment of the present disclosure. FIG. 5 is a view illustrating a process in which a hot pipe is seated on a front flange of an inner case according to an embodiment of the present disclosure. FIG. 6 is a view illustrating a state in which a hot pipe is seated on a front flange of an inner case according to an embodiment of the present disclosure.

Referring to FIGS. 4 to 6, the inner case 100 may include a first inner case 160 forming a refrigerating compartment 22 located on the upper side and a second inner case 170 forming freezing compartments 23 and 24 located on the lower side of the refrigerating compartment 22. The first inner case 160 and the second inner case 170 have partly different shapes, but have the same coupling structure, and thus only the coupling structure of the first inner case 160 will be described.

The first inner case 160 may include an upper plate 110, a lower plate 120, a left plate 130, a right plate 140, and a rear plate 150. The upper plate 110, the lower plate 120, the left plate 130, the right plate 140, and the rear plate 150 may be configured as split parts. The upper plate 110, the lower plate 120, the left plate 130, the right plate 140, and the rear plate 150 may all be injection molded. The upper plate 110, the lower plate 120, the left plate 130, the right plate 140, and the rear plate 150, which may be configured as split parts, may be assembled to form the first inner case 160. The upper plate 110, the lower plate 120, the left plate 130, the right plate 140, and the rear plate 150 may be all injection molded, and thus may be molded to have various patterns P without separate post-processing. The various patterns P may be formed only on some of the upper plate 110, the lower plate 120, the left plate 130, the right plate 140, and the rear plate 150. The various patterns P may be formed on all of the upper plate 110, the lower plate 120, the left plate 130, the right plate 140, and the rear plate 150. In addition, the upper plate 110, the lower plate 120, the left plate 130, the right plate 140, and the rear plate 150 may be molded to have various colors. That is, the upper plate 110, the lower plate 120, the left plate 130, the right plate 140, and the rear plate 150 may have a different pattern P or different color for each use of the storage compartment 20. In addition, the upper plate 110, the lower plate 120, the left plate 130, the right plate 140, and the rear plate 150 may all have different patterns P or different colors. With such a configuration, when a user selects a refrigerator, the range of choices may be widened (see FIG. 22).

The upper plate 110, the lower plate 120, the left plate 130, and the right plate 140 may be integrally formed with front flanges F, respectively. Since the upper plate 110, the lower plate 120, the left plate 130, and the right plate 140 may be all injection molded, the front flanges F covering the front side of the first inner case 160 may be integrally formed with the upper plate 110, the lower plate 120, the left plate 130, and the right plate 140. The front flange F may be integrally formed on each of the upper plate 110, the lower plate 120, the left plate 130, and the right plate 140, but it may be not limited thereto. That is, the front flange F may be integrally formed only on some of the upper plate 110, the lower plate 120, the left plate 130, and the right plate 140.

At the boundary between the first inner case 160 and the second inner case 170, the front flange F may be formed only on the first inner case 160 or the second inner case 170. That is, the front flange F may be formed only on the lower plate 120 of the first inner case 160 between the lower plate of the first inner case 160 and the upper plate of the second inner case 170 forming the boundary between the first inner case 160 and the second inner case 170. In this case, the front flange F formed on the lower plate 120 of the first inner case 160 may be integrally formed with a front flange F' to be formed on the upper plate of the second inner case 170. In the drawing, the front flange F is illustrated as being formed only on the lower plate 120 of the first inner case 160 between the lower plate 120 of the first inner case 160 and the upper plate of the second inner case 170, but it is limited thereto. That is, a front flange may be formed only on the upper plate of the second inner case 170 between the lower plate 120 of the first inner case 160 and the upper plate of the second inner case 170. In addition, a front flange F may be formed on each of the lower plate 120 of the first inner case 160 and the upper plate of the second inner case 170 (see FIG. 9).

When the inner case 100 and the outer case 180 are coupled, the outer case 180 may be coupled to the front flange F of the inner case 100. The front flange F may be formed to extend from an end of the inner case 100 in a direction from the inner case 100 toward the outer case 180.

A hot pipe H may be seated on the front flange F of the inner case 100. When the refrigerator operates, cold air inside the storage compartment 20 may be introduced into the outer case 180 forming the exterior of the main body 10, and the temperature difference between the inside and the outside of the outer case 180 may cause dew condensation on the outer surface of the outer case 180. To prevent this, the hot pipe H for preventing dew condensation from occurring on the outer case 140 may be seated on the front flange 110 of the inner case 100. A seating groove 190 may be formed in the front flange F of the inner case 100 to seat the hot pipe H (see FIG. 3).

The seating groove 190 may be formed on the upper plate 110, the lower plate 120, the left plate 130, and the right plate 140 of the inner case 100 on which the front flange F may be formed. The seating groove 190 may include first seating grooves 191 formed on the front flanges 110 of the upper plate 110, the left plate 130, and the right plate 140 among the front flanges F of the inner case 100. The first seating groove 191 may include a plurality of protrusion portions 193 formed to protrude from the inner bottom surface of the first seating groove 191 so that the hot pipe H comes in close contact with the outer case. The plurality of protrusion portions 193 may be integrally injection-molded with the inner case 100 that is injection-molded. The seating groove 190 may include a second seating groove 195 formed on the front flange F of the lower plate 120 among the front flanges F of the inner case 100.

Figure 7:
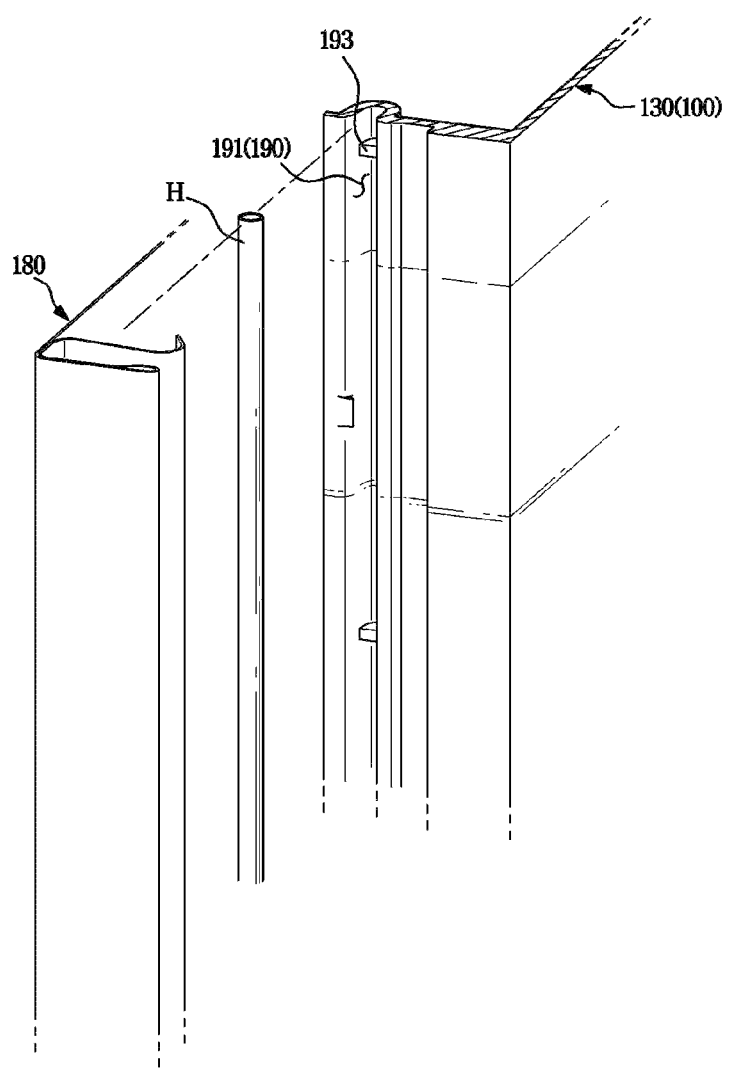
FIG. 7 is a view illustrating a process in which a hot pipe is seated in a first seating groove formed on a front flange of a left plate according to an embodiment of the present disclosure.
Figure 8:
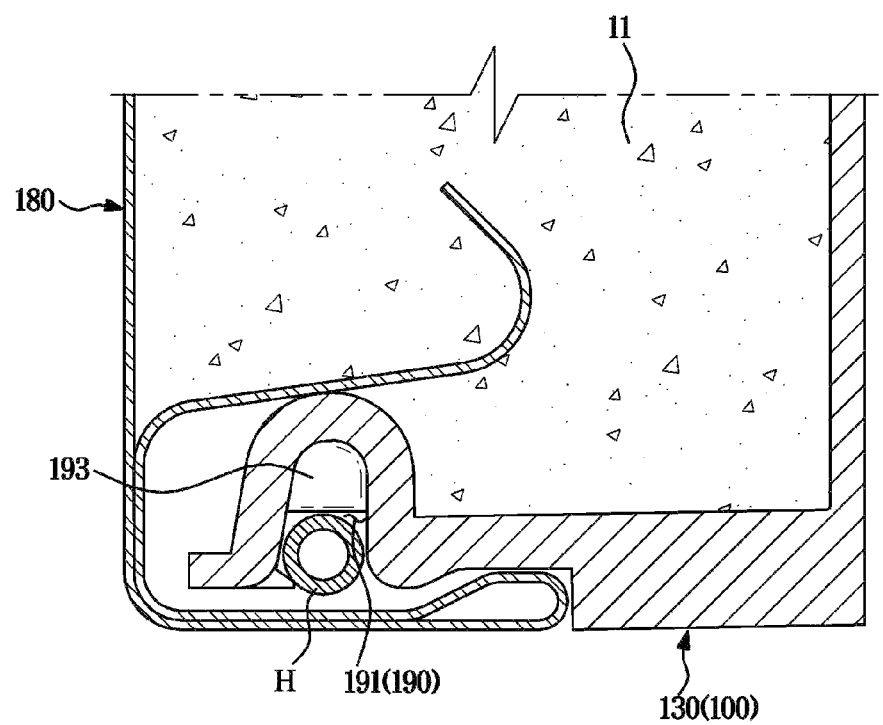
FIG. 8 is a cross-sectional view illustrating a state in which a hot pipe is seated in a first seating groove formed on a front flange of a left plate according to an embodiment of the present disclosure.

FIG. 7 is a view illustrating a process in which a hot pipe is seated in a first seating groove formed on a front flange of a left plate according to an embodiment of the present disclosure. FIG. 8 is a cross-sectional view illustrating a state in which a hot pipe is seated in a first seating groove formed on a front flange of a left plate according to an embodiment of the present disclosure;

Referring to FIGS. 7 and 8, the hot pipe H may be seated in the first seating groove 191 formed in the front flange F of the left plate 130. The first seating groove 191 may include the plurality of protrusion portions 193 that may be integrally formed with the inner case 100 and protrude from the inner bottom surface of the first seating groove 191. The plurality of protrusion portions 193 may allow the hot pipe H to come into close contact with the outer case 180 positioned in front of the inner case 100.

The hot pipe H may be caused to be close contact with the outer case 180 by the plurality of protrusion portions 123 so that the temperature difference between the inside and outside of the outer case 180 may be reduced by the high-temperature heat caused by the high-temperature refrigerant flowing into the hot pipe H, thereby preventing dew formation occurring on the outer surface of the outer case 180.

Since the front flanges F of the upper plate 110 and the right plate 140 of the inner case 100 may be provided with the first seating groove 191 and the plurality of protrusion portions 193 in the same manner as those formed on the front flange F of the left plate 130, the description thereof may be omitted.

Figure 9:
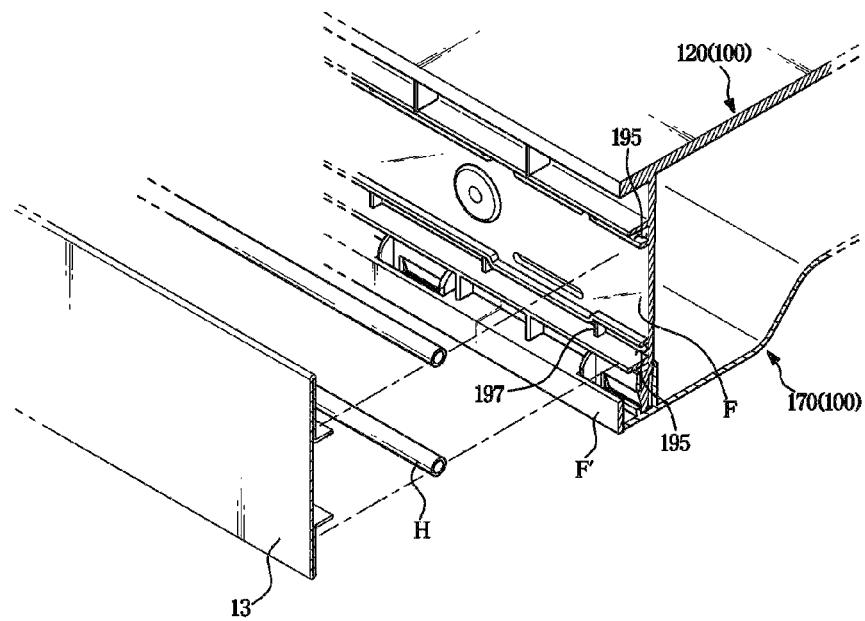
FIG. 9 is a view illustrating a process in which a hot pipe is seated in a second seating groove formed on a front flange of a lower plate according to an embodiment of the present disclosure.
Figure 10:
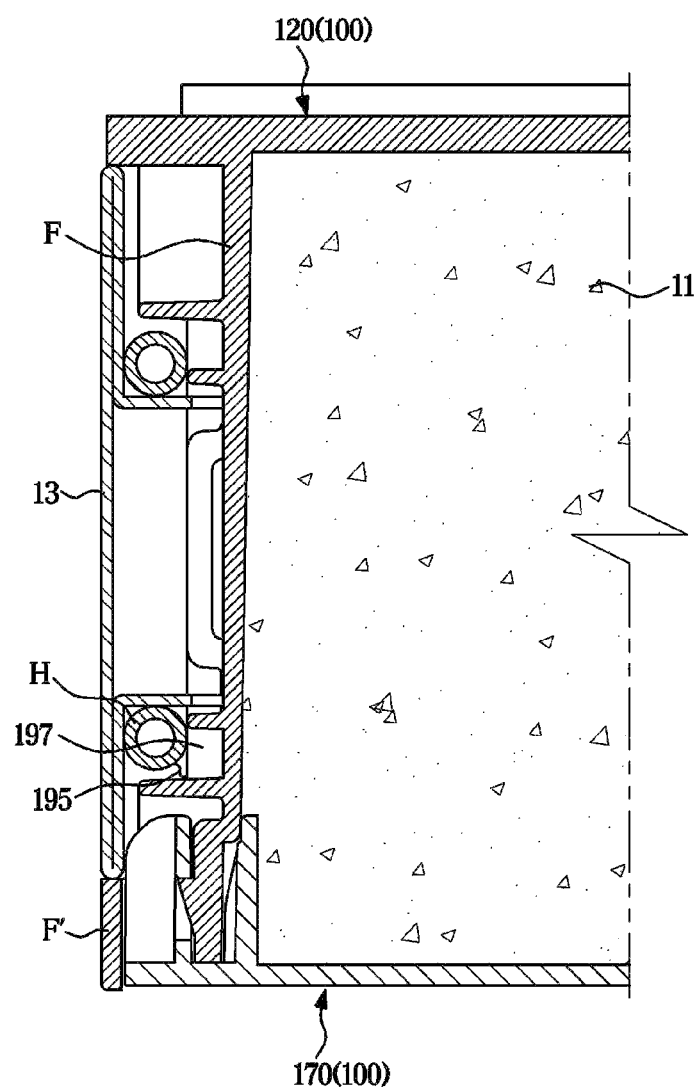
FIG. 10 is a cross-sectional view illustrating a state in which a hot pipe is seated in a second seating groove formed on a front flange of a lower plate according to an embodiment of the present disclosure.

FIG. 9 is a view illustrating a process in which a hot pipe is seated in a second seating groove formed on a front flange of a lower plate according to an embodiment of the present disclosure. FIG. 10 is a cross-sectional view illustrating a state in which a hot pipe is seated in a second seating groove formed on a front flange of a lower plate according to an embodiment of the present disclosure;

Referring to FIGS. 9 to 10, the lower plate 120 of the inner case 100 may be provided on the front side thereof with the front flange F. The front flange F of the lower plate 120 may be provided with the second seating groove 195. A hot pipe H may be seated inside the second seating groove 195. The second seating groove 195 may be provided on the inner bottom surface thereof with a plurality of ribs 197. When the hot pipe H may be seated in the second seating groove 195, a middle front plate 13 may be coupled to the front flange F.

The plurality of ribs 197 may be integrally formed with the inner case 100 on the inner bottom surface of the second seating groove 195. The plurality of ribs 197 may be formed to protrude forward from the inner bottom surface of the second seating groove 195. The plurality of ribs 197 may allow the hot pipe H to come into close contact with the outer case 180 positioned in front of the inner case 100.

The hot pipe H may be caused to be in close contact with the outer case 180 by the plurality of ribs 197 so that the temperature difference between the inside and outside of the outer case 180 may be reduced by the high-temperature heat caused by the high-temperature refrigerant flowing into the hot pipe H, thereby preventing dew formation occurring on the outer surface of the outer case 180.

Figure 11:
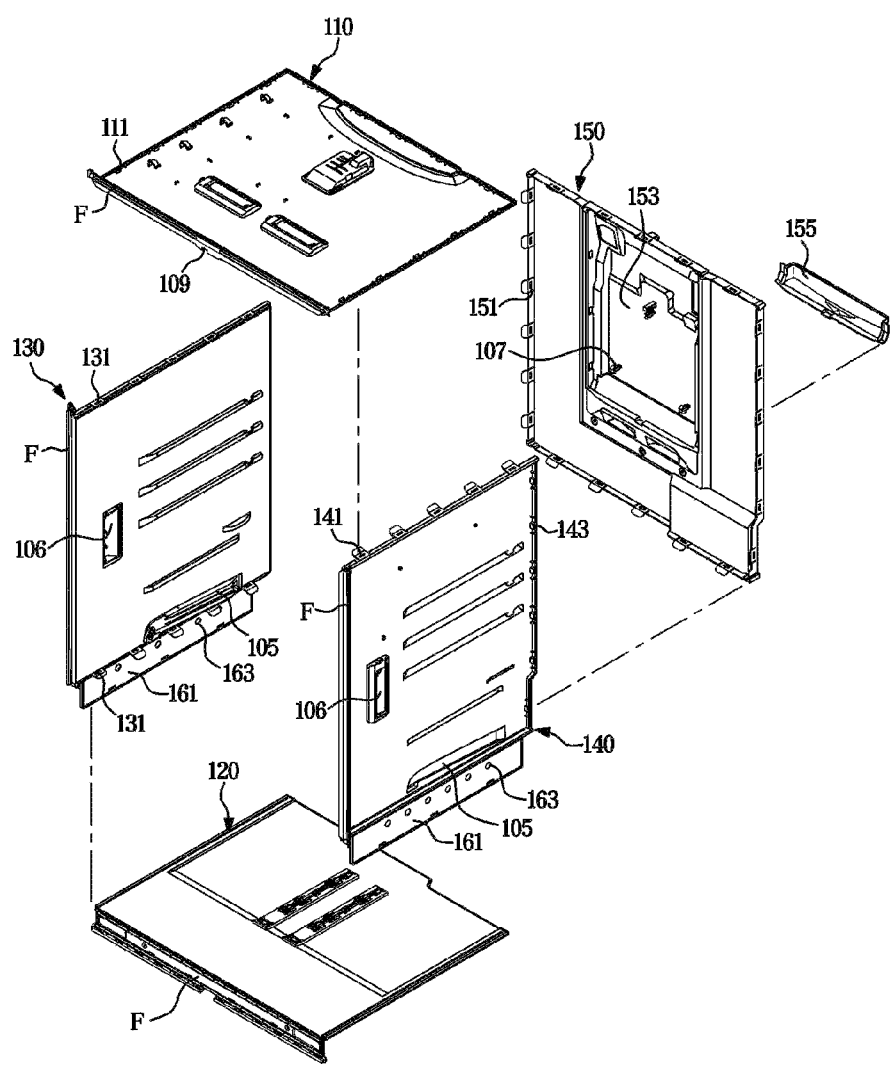
FIG. 11 is a view illustrating a state in which a first inner case is disassembled according to an embodiment of the present disclosure.
Figure 12:
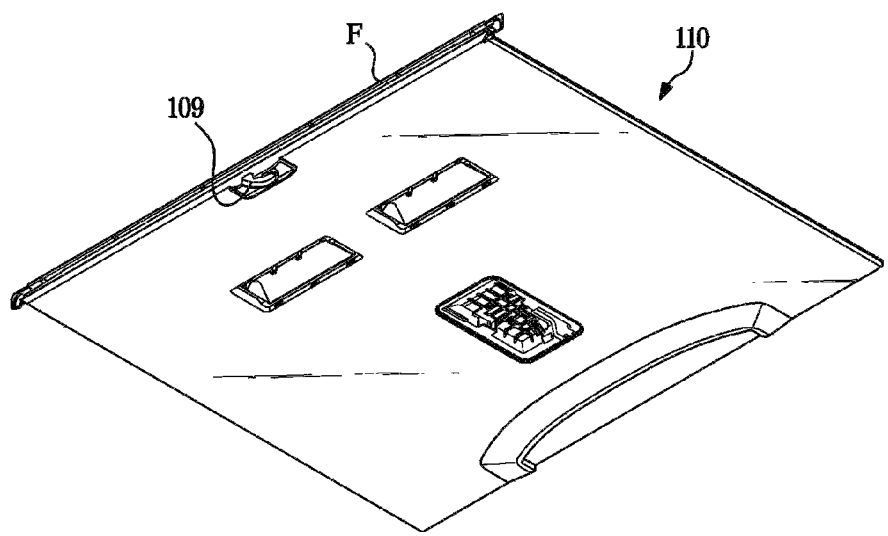
FIG. 12 is a view illustrating a state in which a rotation guide is integrally injection-molded on a lower surface of an upper plate according to an embodiment of the present disclosure.

FIG. 11 is a view illustrating a state in which a first inner case is disassembled according to an embodiment of the present disclosure. FIG. 12 is a view illustrating a state in which a rotation guide is integrally injection-molded on a lower surface of an upper plate according to an embodiment of the present disclosure.

Referring to FIGS. 11 and 12, the lower surface of the upper plate 110 may be integrally injection-molded with a rotation guide 109 for guiding rotation of a rotating bar 35, which is rotatably coupled to a pair of refrigerating compartment doors 31, along with the rotation of the refrigerating compartment door 31 (see FIG. 1).

The left plate 130 and the right plate 140 may be integrally injection-molded with rails 105 on which a storage container 26 is supplied to be slidably moved. The left plate 130 and the right plate 140 may be integrally injection-molded with a case lamp 106 on which an LED L may be supported (see FIG. 1).

The rear plate 150 may be integrally injection-molded with an evaporator installation portion 153 in which an evaporator E may be installed. The front surface of the evaporator installation portion 153 may be integrally injection-molded with an evaporator fixture 107 for fixing the evaporator E. The rear surface of the evaporator installation portion 153 may be injection-molded with a screw fixture 108 to which a screw (not shown) may be fixed. The rear plate 150 may be injection-molded as a thin film to have a competitive material cost, and to this end, a plurality of gates may be required. The rear plate 150 may include a drainage member 155 for draining condensed water falling from the evaporator E. The drain member 155 may be detachably coupled to the rear plate 150. This may be because the gate may not be positioned at a part of the drain member 155 due to the shape of the drain member 155 and thus the drain member 155 may not be integrally injection-molded with the rear plate 150.

The upper plate 110 may include a plurality of first protrusion portions 111 formed on remaining three-side edges excluding the front side edge so that the left plate 130, the right plate 140, and the rear plate 150 may be assembled thereto. The protrusion portion may be, for example, an assembly hook. That is, the upper plate 110 may include a plurality of first assembly hooks formed on the remaining three side edges except for the front side edge. In the drawing, the remaining three side edges of the upper plate 110 except for the front side edge are illustrated as being provided with a plurality of first protrusion portions 111, but it is not limited thereto. That is, the remaining three side edges of the upper plate 110 except for the front side edge may be provided with a plurality of concave portions corresponding to the first protrusion portions 111.

The lower plate 120 may include a plurality of first protrusion portions 121 formed on remaining three-side edges excluding the front side edge so that the left plate 130, the right plate 140, and the rear plate 150 may be assembled thereto. The protrusion portion may be, for example, an assembly hook. That is, the lower plate 120 may include a plurality of first assembly hooks formed on the remaining three side edges except for the front side edge. In the drawing, the remaining three side edges of the lower plate 120 except for the front side edge are illustrated as being provided with a plurality of first protrusion portions 121, but it is not limited thereto. That is, the remaining three side edges of the lower plate 120 except for the front side edge may be provided with having a plurality of concave portions corresponding to the first protrusion portions 121 (see FIG. 16).

The left plate 130 may include a plurality of first concave portions 131 formed on the upper and lower side edges such that the plurality of first protrusion portions 111 and 121 formed on the upper plate 110 and the lower plate 120 are assembled thereto. The concave portion may be, for example, an assembly hole into which an assembly hook may be inserted and assembled. That is, the left plate 130 may include a plurality of first assembly holes formed on the upper and lower side edges. In the drawings, the upper and lower side edges of the left plate 130 are illustrated as being provided with a plurality of first concave portions 131, but it is not limited thereto. That is, the upper and lower side edges of the left plate 130 may be provided with a plurality of protrusion portions corresponding to the first concave portions 131. In this case, the upper plate 110 and the lower plate 120 to which the left plate 130 may be assembled may be provided with a plurality of concave portions.

The left plate 130 may include a plurality of second protrusion portions 133 formed on the rear side edge such that the rear plate 150 is assembled thereto. The protrusion portion may be, for example, an assembly hook. That is, the left plate 130 may include a plurality of second assembly hooks formed on the rear side edge. In the drawing, the rear side edge of the left plate 130 is illustrated as be provided with a plurality of second protrusion portions 133, but it is not limited thereto. That is, the rear side edge of the left plate 130 may be provided with a plurality of concave portions corresponding to the second protrusion portions 133. In this case, the rear plate 150 to which the left plate 130 may be assembled may be provided with a plurality of protrusion portions (see FIG. 15).

The right plate 140 may include a plurality of first concave portions 141 formed on the upper and lower side edges such that the plurality of first protrusion portions 111 and 121 formed on the upper plate 110 and the lower plate 120 are assembled thereto. The concave portion may be, for example, an assembly hole into which an assembly hook may be inserted and assembled. That is, the right plate 140 may include a plurality of first assembly holes formed on the upper and lower side edges. In the drawings, the upper and lower side edges of the right plate 140 are illustrated as being provided with a plurality of first concave portions 141, but it is not limited thereto. That is, the upper and lower side edges of the right plate 140 may be provided with a plurality of protrusion portions corresponding to the first concave portions 141. In this case, the upper plate 110 and the lower plate 120 to which the right plate 140 may be assembled may be provided with a plurality of concave portions.

The right plate 140 may include a plurality of second protrusion portions 143 formed on the rear side edge such that the rear plate 150 is assembled thereto. The protrusion portion may be, for example, an assembly hook. That is, the right plate 140 may include a plurality of second assembly hooks formed on the rear side edge. In the drawing, the rear side edge of the right plate 140 is illustrated as be provided with a plurality of second protrusion portions 143, but it is not limited thereto. That is, the rear side edge of the right plate 140 may be provided with a plurality of concave portions corresponding to the second protrusion portion 143. In this case, the rear plate 150 to which the right plate 140 may be assembled may be provided with a plurality of protrusion portions.

The rear plate 150 may include a plurality of second concave portions 151 formed on four side edges such that the plurality of first protrusion portions 111 and 121 formed on the rear side edges of the upper plate 110 and the lower plate 120 and the plurality of second protrusion portions 133 and 143 formed on the rear side edges of the left plate 130 and the right plate 140 may be assembled thereto. The concave portion may be, for example, an assembly hole into which an assembly hook may be inserted and assembled. That is, the rear plate 150 may include a plurality of second assembly holes formed on the four side edges. In the drawing, the four side edges of the rear plate 150 are illustrated as being provided with a plurality of second concave portions 151, but it is not limited thereto. That is, the four side edges of the rear plate 150 may be provided with a plurality of protrusion portions corresponding to the second concave portions 151. In this case, the rear side edges of the upper and lower plates 110 and 120 and the rear side edges of the left and right plates 130 and 140 to which the rear plate 150 may be assembled may be provided with a plurality of concave portions.

Figure 13:
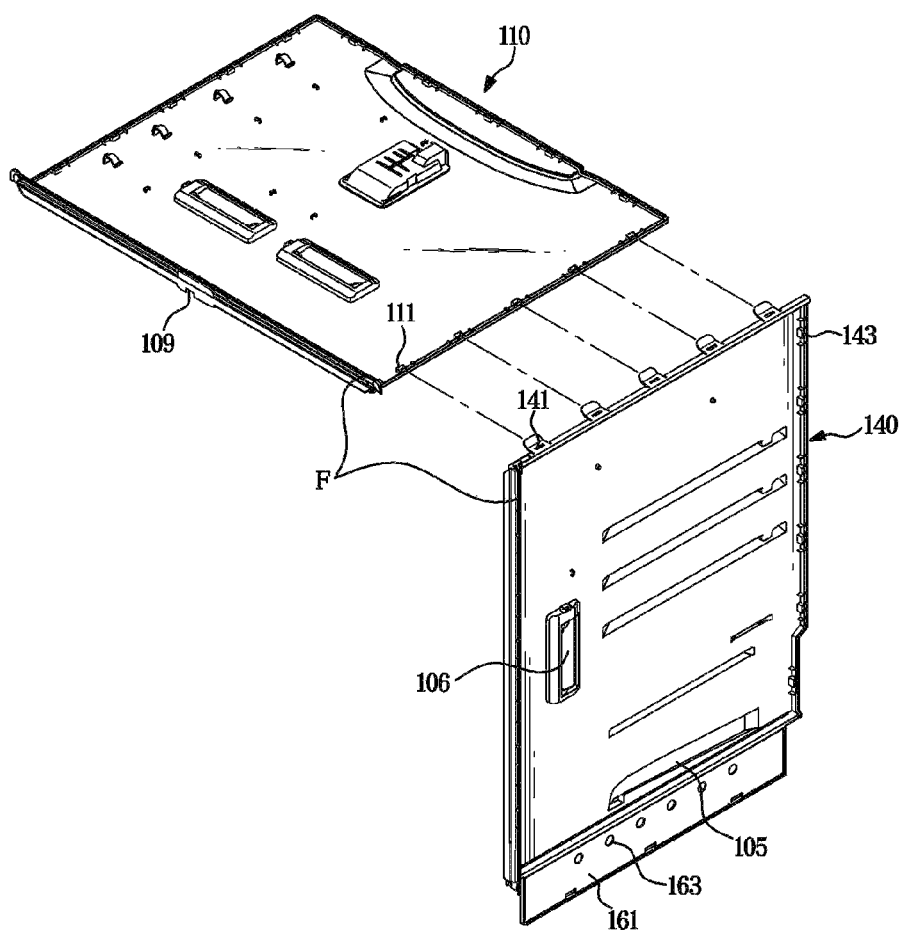
FIG. 13 is a view illustrating a process in which an upper plate and a right plate are assembled according to an embodiment of the present disclosure.
Figure 14:
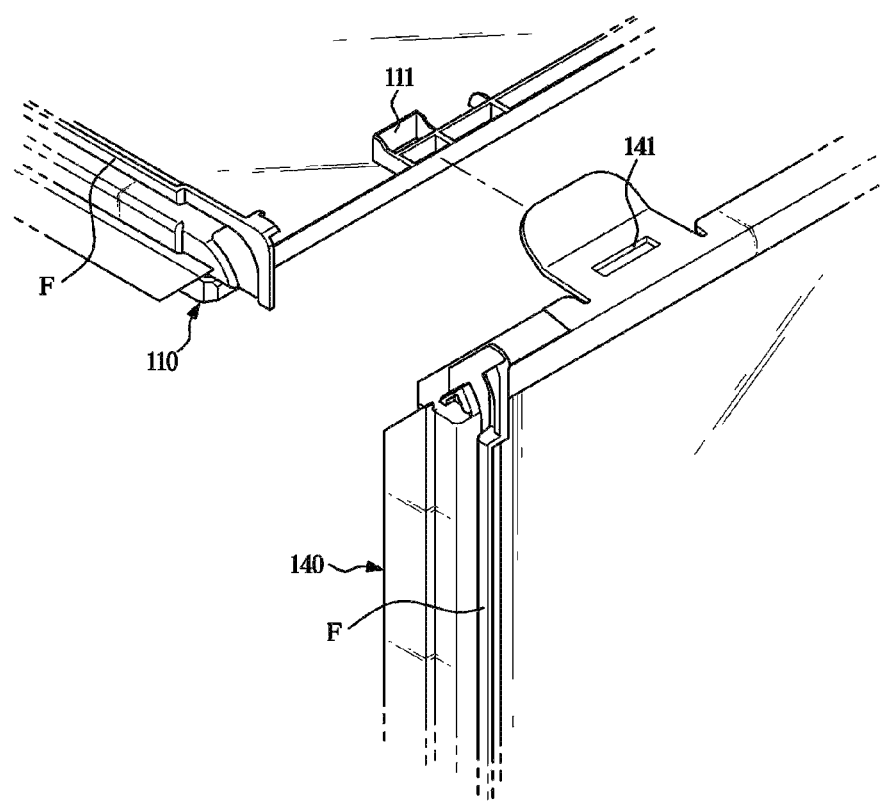
FIG. 14 is a view illustrating a process in which a plurality of first protrusion portions of an upper plate is assembled to a plurality of first concave portions of a right plate according to an embodiment of the present disclosure.
Figure 15:
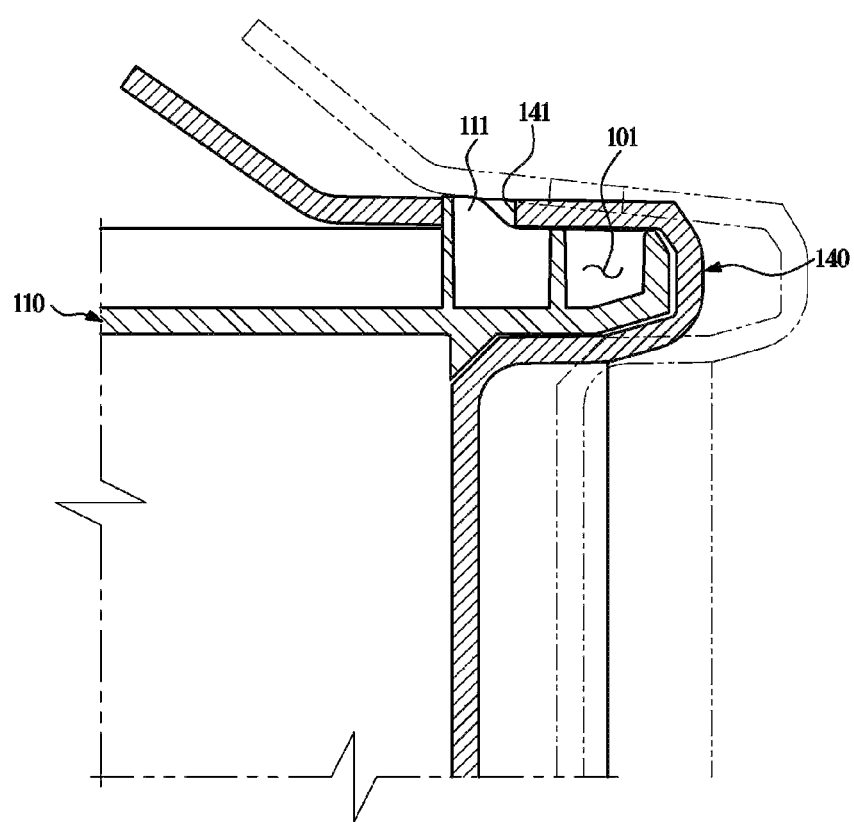
FIG. 15 is a cross-sectional view of a first protrusion portion and a first concave portion in a state in which an upper plate and a right plate are assembled to each other according to an embodiment of the present disclosure.

FIG. 13 is a view illustrating a process in which an upper plate and a right plate are assembled according to an embodiment of the present disclosure. FIG. 14 is a view illustrating a process in which a plurality of first protrusion portions of an upper plate is assembled to a plurality of first concave portions of a right plate according to an embodiment of the present disclosure. FIG. 15 is a cross-sectional view of a first protrusion portion and a first concave portion in a state in which an upper plate and a right plate are assembled to each other according to an embodiment of the present disclosure;

Referring to FIGS. 13 to 15, the plurality of first protrusion portions 111 formed on the right side edge of the upper plate 110 may be assembled with the plurality of first concave portions 141 formed on the upper side edge of the right plate 140, thereby assembling the upper plate 110 and the right plate 140. The upper plate 110 and the right plate 140 may be assembled to have an inversed "L" shape, and may be stacked in plural in an inversed "L" shape assembly state and stored. Since the first inner case 160 may be configured in a plurality of splits, when the first inner cases 160 are staked in plural in an inversed "L" shape assembly state and stored, the overall volume may be reduced during loading/storage and thus a larger number of inner cases may be stored in a small space. In addition, a larger number of inner cases may be transported at one time during transportation. However, it is not limited thereto, and the upper plate 110 and the right plate 140 may each be stacked in a flat panel shape corresponding to a state before assembly, and stored or transported.

The first inner case 160 may include a heat insulating material storage portion 101 formed by the first protrusion portion 111 of the upper plate 110 and the first concave portion 141 of the right plate 140 when the upper plate 110 and the right plate 140 are assembled. The heat insulating material storage portion 101 may be located on a path through which a portion of the heat insulating material 11 foamed between the inner case 100 and the outer case 180 penetrates into the storage compartment 20 and provided to prevent the heat insulating material 11 from entering the storage compartment 20. In the drawings, the heat insulating material storage portion 101 is illustrated as being formed by the first protrusion portion 111 and the first concave portion 141 when the upper plate 110 and the right plate 140 are assembled, but it is not limited thereto. That is, the insulating material storage portion 101 may be formed by both sides assembled when the upper plate 110, the lower plate 120, the left plate 130, the right plate 140, and the rear plate 150 are assembled.

Figure 16:
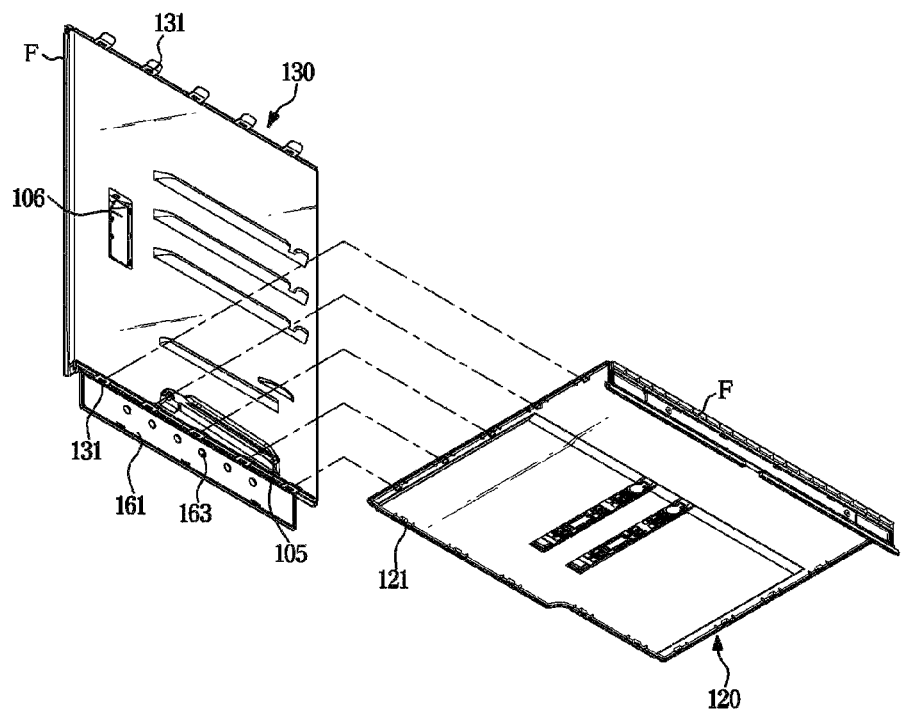
FIG. 16 is a view illustrating a process in which a lower plate and a left plate are assembled according to an embodiment of the present disclosure.
Figure 17:
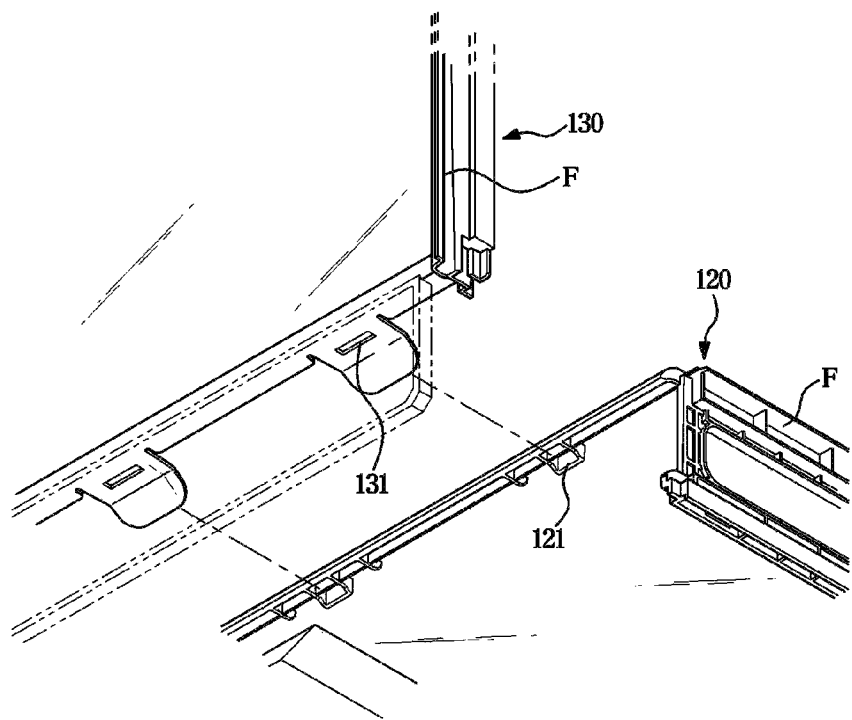
FIG. 17 is a view illustrating a process in which a plurality of first protrusion portions of a lower plate is assembled to a plurality of first concave portions of a left plate according to an embodiment of the present disclosure.
Figure 18:
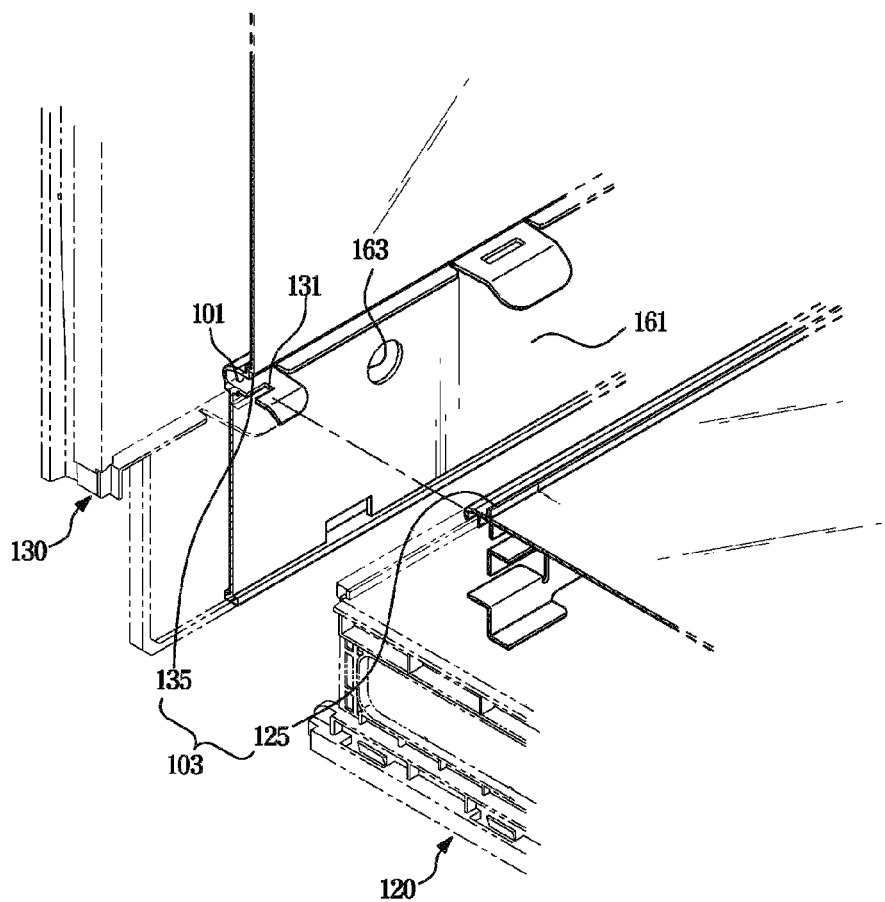
FIG. 18 is a view of FIG. 17, when viewed from a different direction.
Figure 19:
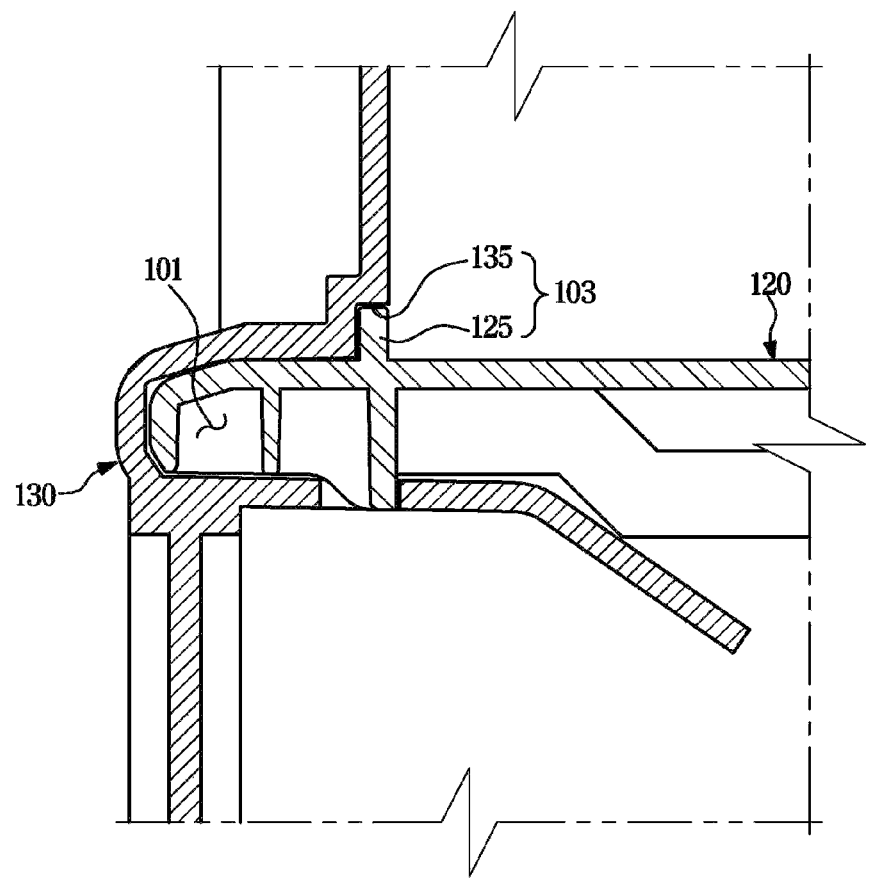
FIG. 19 is a cross-sectional view of a first protrusion portion and a first concave portion in a state in which a lower plate and a left plate are assembled to each other according to an embodiment of the present disclosure.

FIG. 16 is a view illustrating a process in which a lower plate and a left plate are assembled according to an embodiment of the present disclosure. FIG. 17 is a view illustrating a process in which a plurality of first protrusion portions of a lower plate is assembled with a plurality of first concave portions of a left plate according to an embodiment of the present disclosure. FIG. 18 is a view of FIG. 17, when viewed from a different direction. FIG. 19 is a cross-sectional view of a first protrusion portion and a first concave portion in a state in which a lower plate and a left plate are assembled with each other according to an embodiment of the present disclosure.

Referring to FIGS. 16 to 19, the plurality of first protrusion portions 121 formed on the left side edge of the lower plate 120 may be assembled with the plurality of first concave portions 131 formed on the lower side edge of the left plate 130, thereby assembling the lower plate 120 and the left plate 130. The lower plate 120 and the left plate 130 may be assembled to have an "L" shape, and may be stacked in plural in an "L" shape assembly state and stored. Since the first inner case 160 may be configured in a plurality of splits, when the first inner case 160 are staked in plural in an "L" shape assembly state and stored, the overall volume may be reduced during loading/storage and thus a larger number of inner cases may be stored in a small space. In addition, a larger number of inner cases may be transported at one time during transportation. However, it is not limited thereto, and the lower plate 110 and the left plate 130 may each be stacked in a flat panel shape corresponding to a state before assembly, and stored or transported.

The lower plate 120 may include a protrusion portion 125 formed to protrude from a left side of the lower plate 120 assembled with the left plate 130 when the lower plate 120 and the left plate 130 are assembled with each other. The left plate 130 may include a groove portion 135 formed in a grooved shape on a lower right side of the left plate 130 assembled with the lower plate 120 when the lower plate 120 and the left plate 130 are assembled with each other, to accommodate the protrusion portion 125. In the drawing, the protrusion portion 125 is illustrated as being formed on the left side of the lower plate 120, and the groove portion 135 is illustrated as being formed on the lower right side of the left plate 130, but it is not limited thereto. That is, when the lower plate 120 and the right plate 140 are assembled, a protrusion portion may be formed on a right side of the lower plate 120, and a groove portion may be formed on a lower left side of the right plate 140. In addition, when the upper plate 110 and the right plate 140 may be assembled, a protrusion portion may be formed on a right side of the upper plate 110, and a groove portion may be formed on an upper left side of the right plate 140. In addition, when the upper plate 110 and the left plate 130 may be assembled, a protrusion portion may be formed on a left side of the upper plate 110, and a groove portion may be formed on an upper right side of the left plate 130. Accordingly, when an assembly of the lower plate 120 and the left plate 130 is taken as an example, the first inner case 160 may include adjacent surfaces 103 including the protrusion portion 125 and the groove portion 135. The adjacent surfaces 103 may refer to two planes that share one side but may not lie on the same plane. Since the first inner case 160 includes the adjacent surfaces 103, the first inner case 160 may be more firmly assembled.

Even when the lower plate 120 and the left plate 130 is assembled, similarly to when the upper plate 110 and the right plate 140 are assembled with each other, a heat insulating material storage portion 101 formed by the first protrusion portion 121 of the upper plate 120 and the first concave portion 131 of the left plate 130 when the lower plate 120 and the left plate 130 are assembled may be provided.

Figure 20:
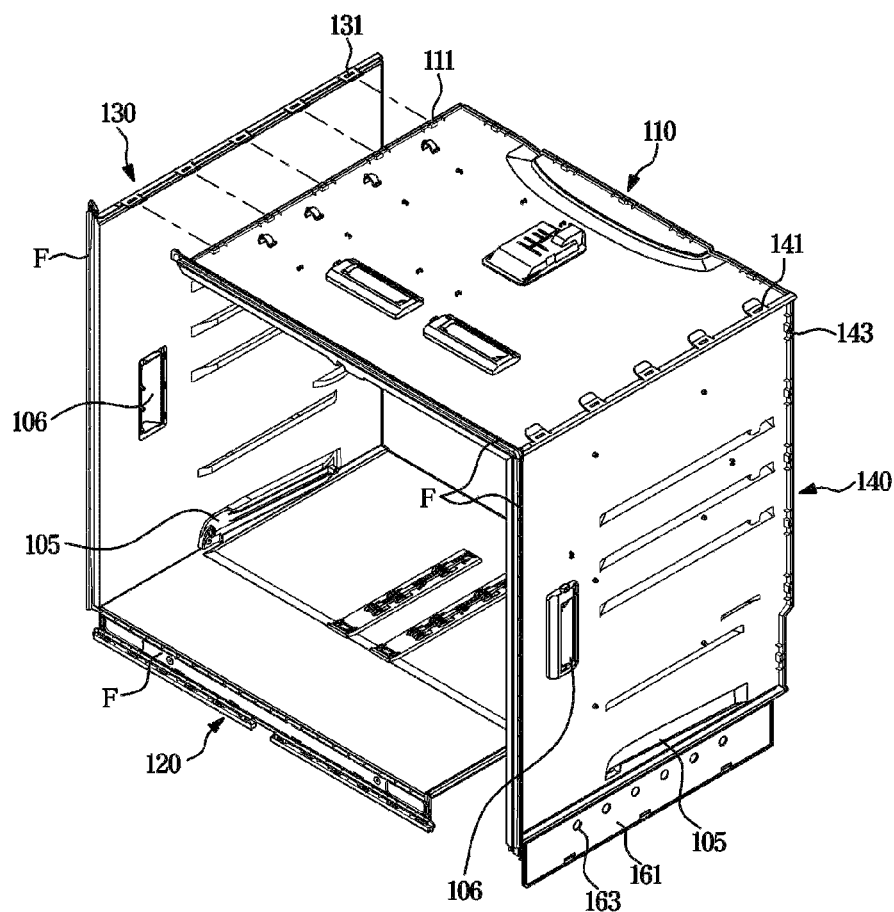
FIG. 20 is a view illustrating a process in which an upper plate and a right plate assembled in an inverse "L" shape is assembled to a lower plate and a left plate assembled in an "L" shape according to an embodiment of the present disclosure.
Figure 21:
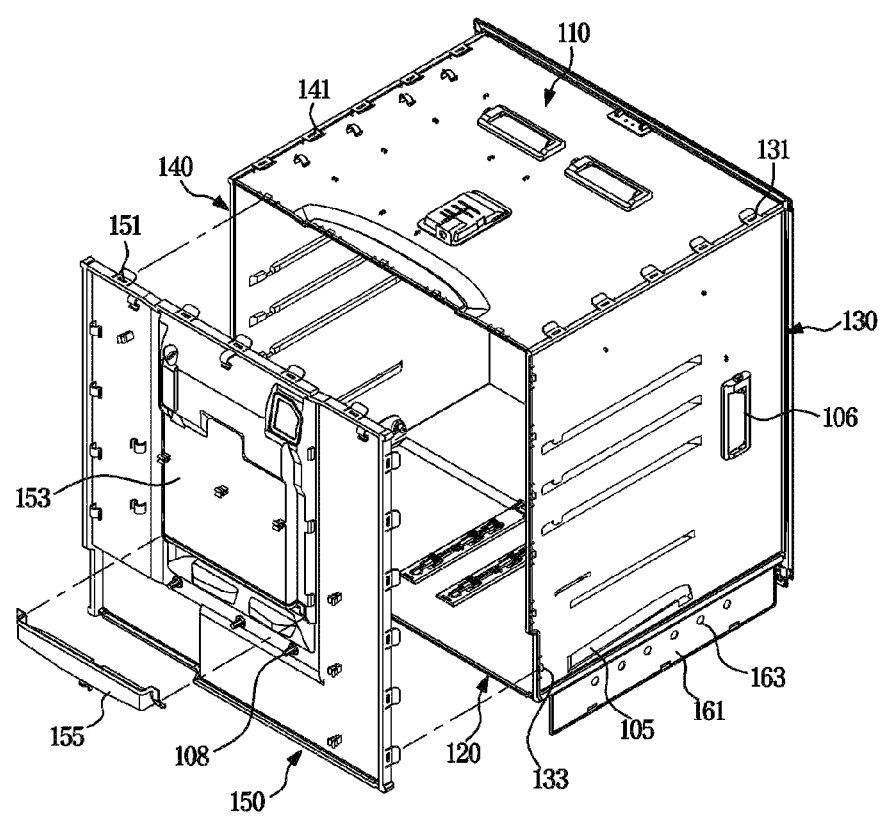
FIG. 21 is a view illustrating a process in which a rear plate is assembled in a state in which an upper plate, a lower plate, a left plate, and a right plate are assembled according to an embodiment of the present disclosure.
Figure 22:
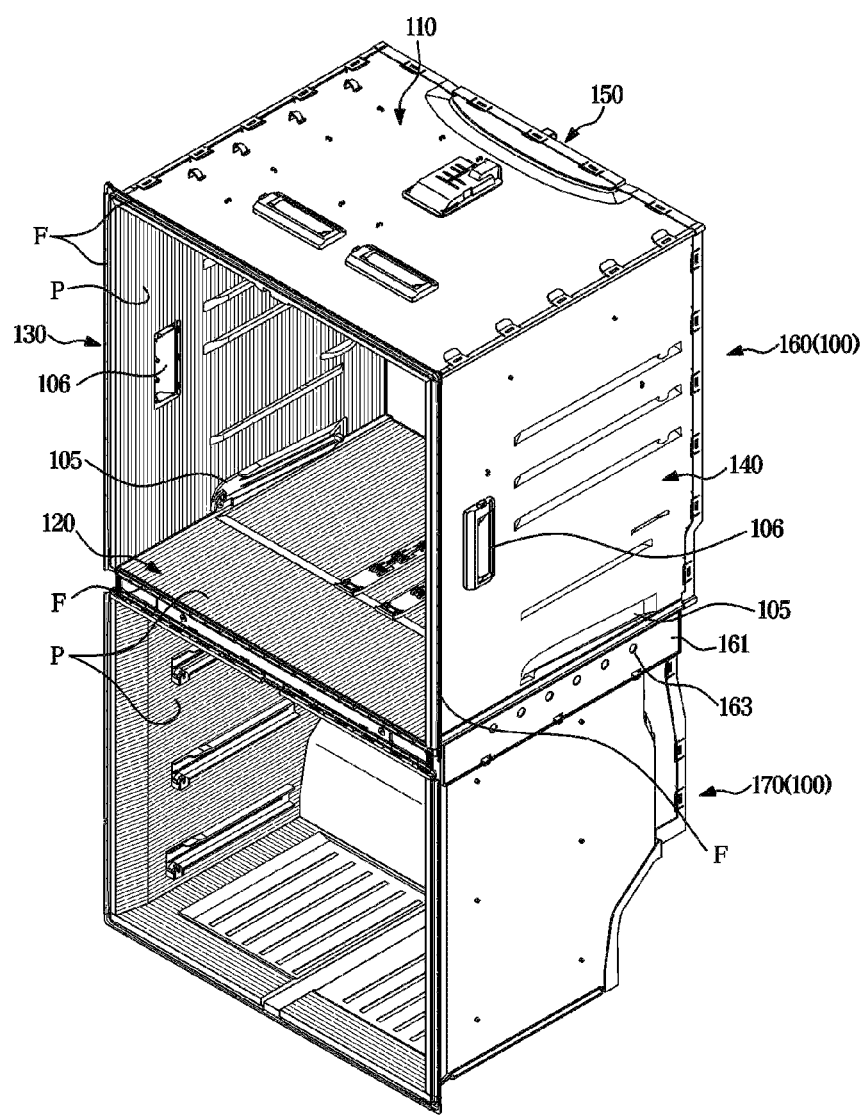
FIG. 22 is a view illustrating a state in which a first inner case and a second inner case are assembled to each other according to an embodiment of the present disclosure.
Figure 23:
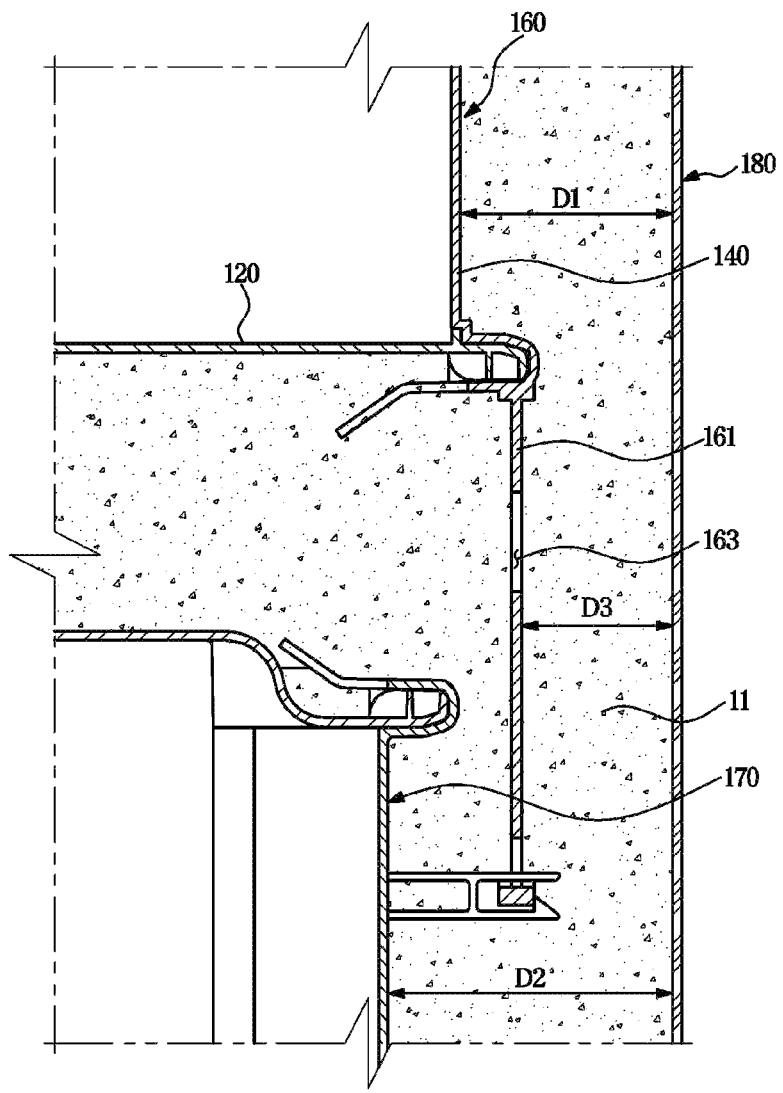
FIG. 23 is a view illustrating an extension panel formed on a first inner case according to an embodiment of the present disclosure.

FIG. 20 is a view illustrating a process in which an upper plate and a right plate assembled in an inverse "L" shape is assembled with a lower plate and a left plate assembled in an "L" shape according to an embodiment of the present disclosure. FIG. 21 is a view illustrating a process in which a rear plate is assembled in a state in which an upper plate, a lower plate, a left plate, and a right plate are assembled according to an embodiment of the present disclosure. FIG. 22 is a view illustrating a state in which a first inner case and a second inner case are assembled with each other according to an embodiment of the present disclosure. FIG. 23 is a view illustrating an extension panel formed on a first inner case according to an embodiment of the present disclosure.

Referring to FIG. 20, as for the upper plate 110 and the right plate 140 assembled in an inversed "L" shape and the lower plate 120 and the left plate 130 assembled in an "L" shape, the upper plate 110 may be assembled with the left plate 130, and the lower plate 120 may be assembled with the right plate 140. The plurality of first protrusion portions 111 formed on the left side edge of the upper plate 110 may be assembled with the plurality of first concave portions 131 formed on the upper side edge of the left plate 130. In addition, the plurality of first protrusion portions 121 formed on the right side edge of the lower plate 120 may be assembled with the plurality of first concave portions 141 formed on the lower side edge of the right plate 140. With such a configuration, the upper plate 110, the lower plate 120, the left plate 130, and the right plate 140 may be assembled.

Referring to FIG. 21, the rear plate 150 may be assembled in a state in which the upper plate 110, the lower plate 120, the left plate 130, and the right plate 140 are assembled. The plurality of first protrusion portions 111 and 121 formed on the rear side edges of the upper and lower plates 110 and 120 may be assembled with the plurality of second concave portions 151 formed on the upper and lower side edges of the rear plate 150. The plurality of second protrusion portions 133 and 143 formed on the rear side edges of the left plate 130 and the right plate 140 may be assembled with the plurality of second concave portions 151 formed on the left and right side edges of the rear plate 150. A drain member 155 may be detachably coupled to the rear surface of the rear plate 150.

Referring to FIGS. 22 and 23, the upper plate 110, the lower plate 120, the left plate 130, the right plate 140, and the rear plate 150 may be all assembled so that the first inner case 160 may be assembled, after which the second inner case 170 may be assembled in the same manner as the first inner case 160, and then the first inner case 160 and the second inner case 170 may be assembled.

The distance D2 between each side of the second inner case 170 forming the freezing compartments 23 and 24 and the outer case 180 may be greater than the distance D1 between each side of the first inner case 160 forming the refrigerating compartment 22 and the outer case 180. Since the freezing compartments 23 and 24 maintain a lower temperature than the refrigerating compartment 22, a thicker insulation may be required. When the insulation thicknesses are different as described above, the outer case 180 adjacent to a boundary part between the first inner case 160 and the second inner case 170, that is, a middle gap part, in which the first partition 17 is located, and an upper side part of the second inner case 170, may be subject to shrinkage and bending. In order to prevent this, the distance D2 between each side of the second inner case 170 and the outer case 180 should not be greatly different from the distance D1 between each side of the first inner case 160 and the outer case 180. To this end, the first inner case 160 may be integrally formed with an extension panel 161 extending in parallel from a lower portion of the first inner case 160 in a direction toward the second inner case 170. The extension panel 161 may extend from the lower portion of the first inner case 160 to the upper side part of the second inner case 170. In the drawing, the extension panel 161 is illustrated as extending in parallel from the lower portion of the first inner case 160 in a direction toward the second inner case 170, but it is not limited thereto. That is, the extension panel may extend in parallel from the upper portion of the second inner case 170 in a direction toward the first inner case 160. In this case, the extension panel may extend from the upper portion of the second inner case 170 to the lower side part of the first inner case 160. Due to the extension panel 161, the difference between the distance D1 between each side of the first inner case 160 and the outer case 180 and the distance D3 between the extension panel 161 and the outer case 180 at the boundary part between the first inner case 160 and the second inner case 170 may be minimized. The extension panel 161 may include a plurality of holes 163 through which a heat insulating material 11 may pass so that the heat insulating material 11 may be disposed both between the extension panel 161 and the outer case 180 and between the extension panel 161 and each side of the second inner case 170.

Figure 24:
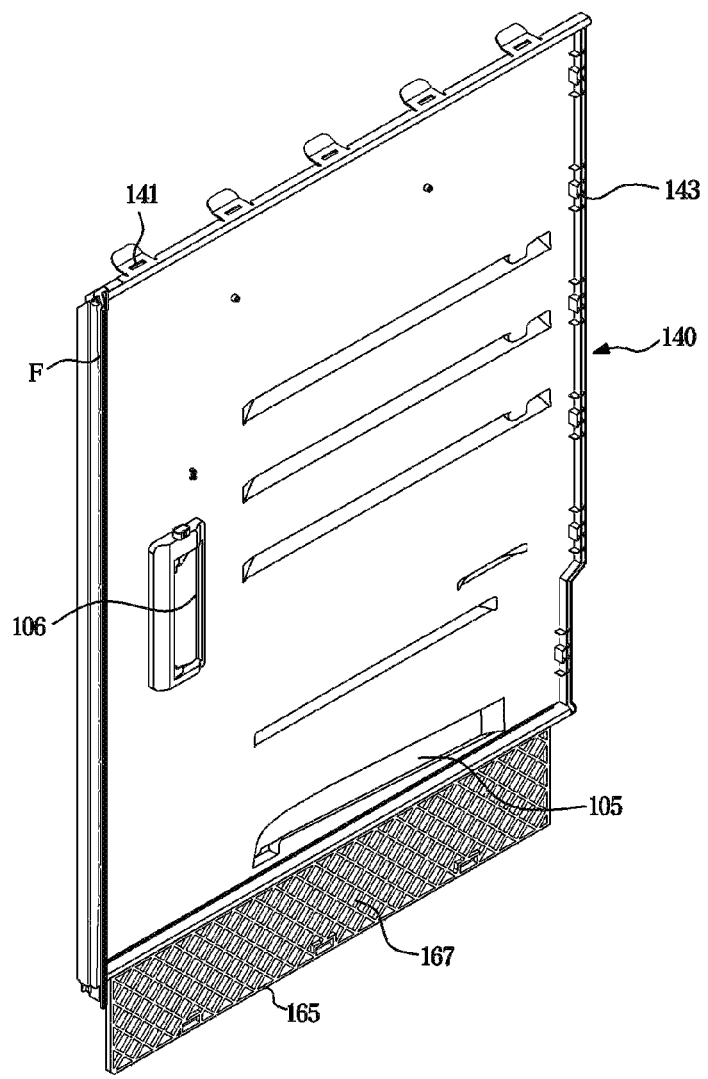
FIG. 24 is a view illustrating a state in which an extension panel is integrally formed with a right plate of a first inner case according to another embodiment of the present disclosure.

FIG. 24 is a view illustrating a state in which an extension panel is integrally formed with a right plate of a first inner case according to another embodiment of the present disclosure.

Referring to FIG. 24, the extension panel 165 may be formed to have a mesh shape including a plurality of holes 167. In the drawings, the extension panel 165 is illustrated as being integrally formed with the right plate 140, but it is not limited thereto. That is, the extension panel 165 may be integrally formed with the lower plate 120 and the left plate 130 as well.

Figure 25:
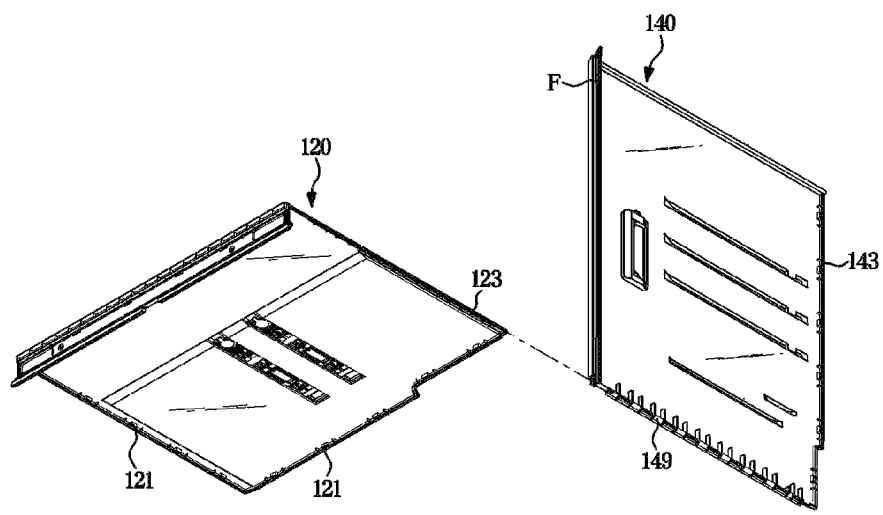
FIG. 25 is a view illustrating a process in which a lower plate and a right plate are assembled according to another embodiment of the present disclosure.
Figure 26:
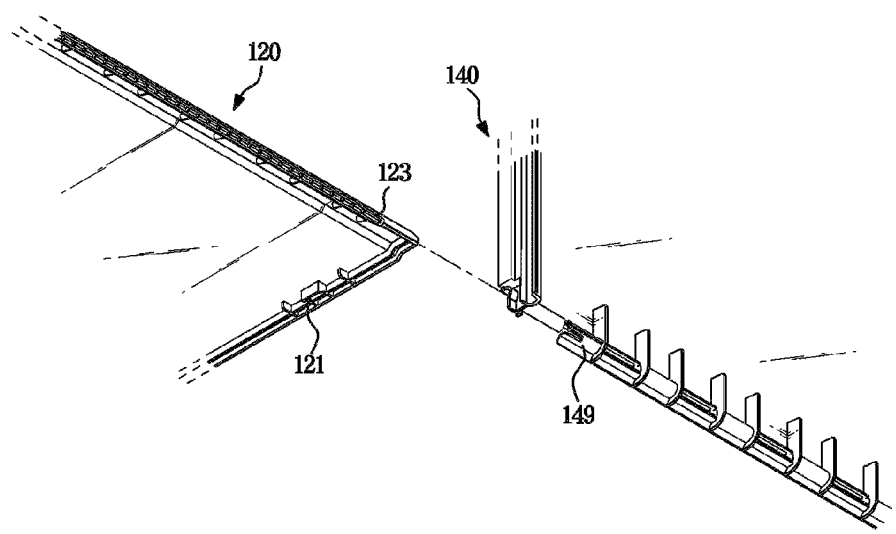
FIG. 26 is a view illustrating a process in which a hinge shaft of a lower plate is inserted into a hinge shaft accommodating portion of a right plate according to another embodiment of the present disclosure.
Figure 27:
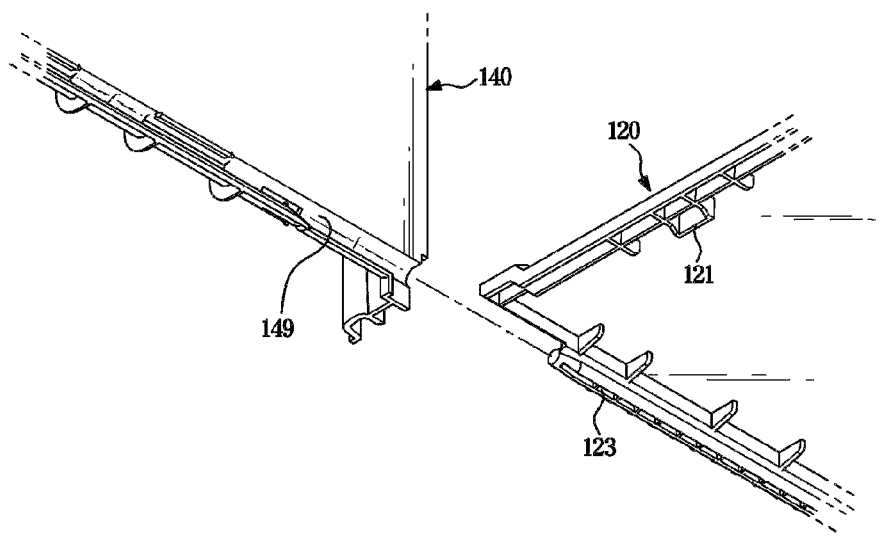
FIG. 27 is a view of FIG. 26 when viewed from a different direction.
Figure 28:
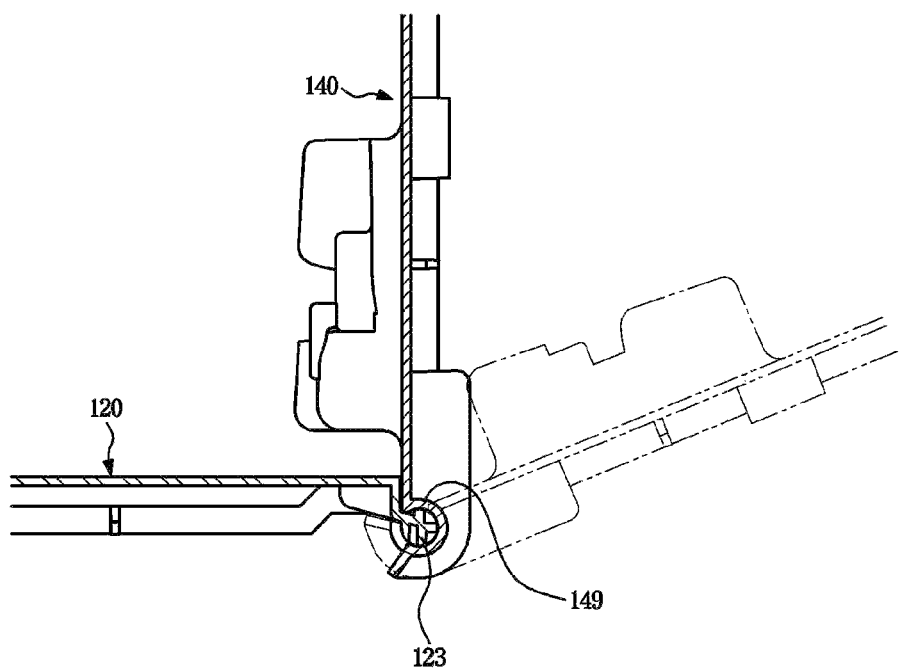
FIG. 28 is a view illustrating a state in which a lower plate is rotatably assembled to a right plate according to another embodiment of the present disclosure.

FIG. 25 is a view illustrating a process in which a lower plate and a right plate are assembled according to another embodiment of the present disclosure. FIG. 26 is a view illustrating a process in which a hinge shaft of a lower plate is inserted into a hinge shaft accommodating portion of a right plate according to another embodiment of the present disclosure. FIG. 27 is a view of FIG. 26 when viewed from a different direction. FIG. 28 is a view illustrating a state in which a lower plate is rotatably assembled with a right plate according to another embodiment of the present disclosure.

Referring to FIGS. 25 to 28, the lower plate 120 and the right plate 140 may be hinge-assembled with each other. That is, the right side of the lower plate 120 and the lower side of the right plate 140 may be rotatably hinge-assembled with each other. To this end, a hinge shaft 123 may be formed on the edge of the right side of the lower plate 120. A hinge shaft accommodating portion 149 into which the hinge shaft 123 may be rotatably inserted may be formed on the edge of the lower side of the right plate 140. The lower plate 120 may be provided on the remaining sides except for the right side with a plurality of first protrusion portions 121 in the same manner as the lower plate 120 shown in FIGS. 13 to 20. In addition, the right plate 140 may be provided on the remaining sides except for the lower side with a plurality of first concave portions 141 and a plurality of second concave portions 143 in the same manner as the right plate 140 shown in FIGS. 13 to 20.

Figure 29:
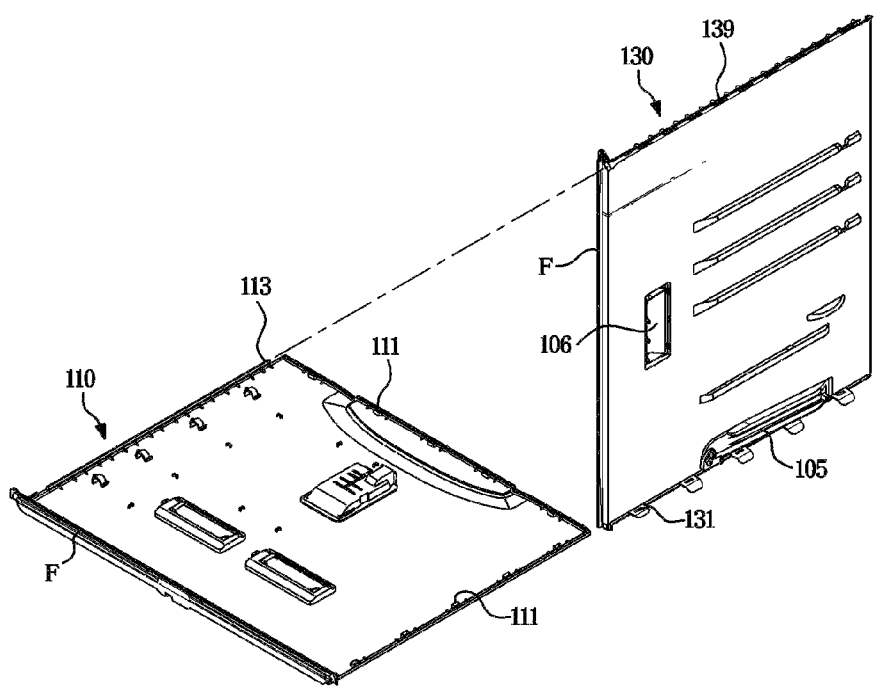
FIG. 29 is a view illustrating a process in which an upper plate and a left plate are assembled to each other according to another embodiment of the present disclosure.

FIG. 29 is a view illustrating a process in which an upper plate and a left plate are assembled with each other according to another embodiment of the present disclosure.

Referring to FIG. 29, the upper plate 110 and the left plate 130 may be hinged-assembled. That is, the left side of the upper plate 110 and the upper side of the left plate 130 may be rotatably hinge-assembled. To this end, a hinge shaft 113 may be formed on the edge of the left side of the upper plate 110. A hinge shaft accommodating portion 139 into which the hinge shaft 113 may be rotatably inserted may be formed on the edge of the upper side of the left plate 130. The upper plate 110 may be provided on the remaining sides except for the left side with a plurality of first protrusion portions 111 in the same manner as the upper plate 110 shown in FIGS. 13 to 20. In addition, the left plate 130 may be provided on the remaining sides of the upper side with a plurality of first concave portions 131 and a plurality of second protrusion portions 133 in the same manner as the left plate 130 shown in FIGS. 13 to 20.

Figure 30:
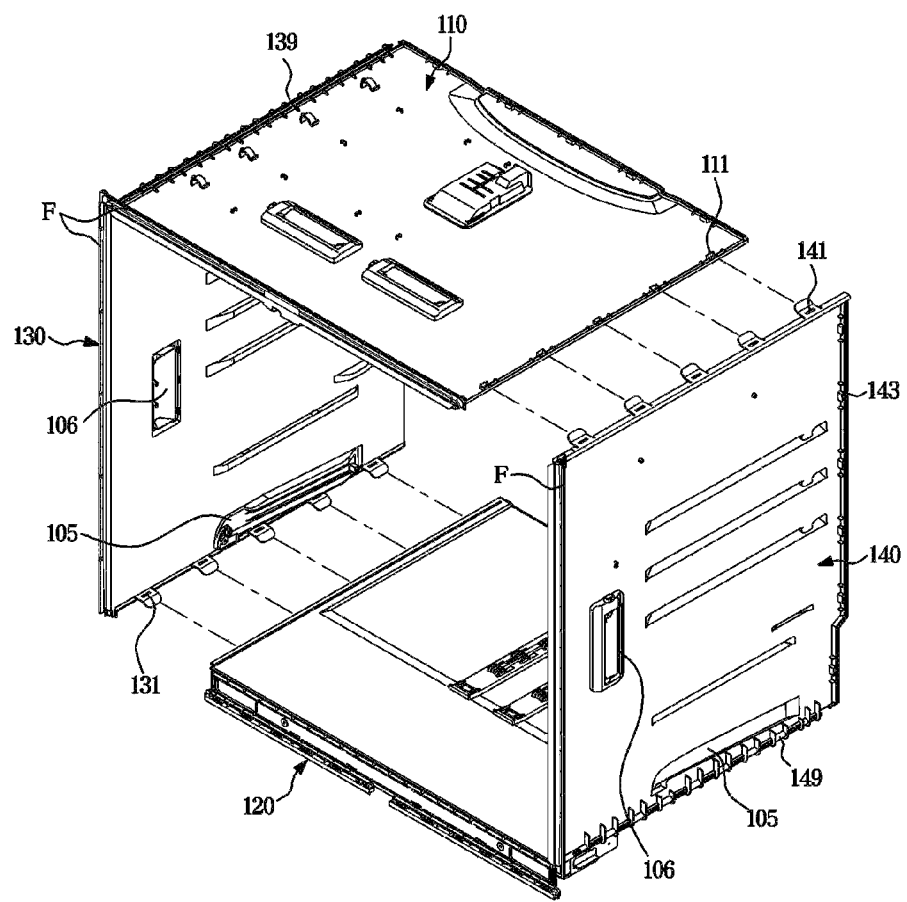
FIG. 30 is a view illustrating a process in which while a lower plate is hinged to a right plate i and an upper plate is hinged to a left plate, remaining parts are hook-coupled according to another embodiment of the present disclosure.
Figure 31:
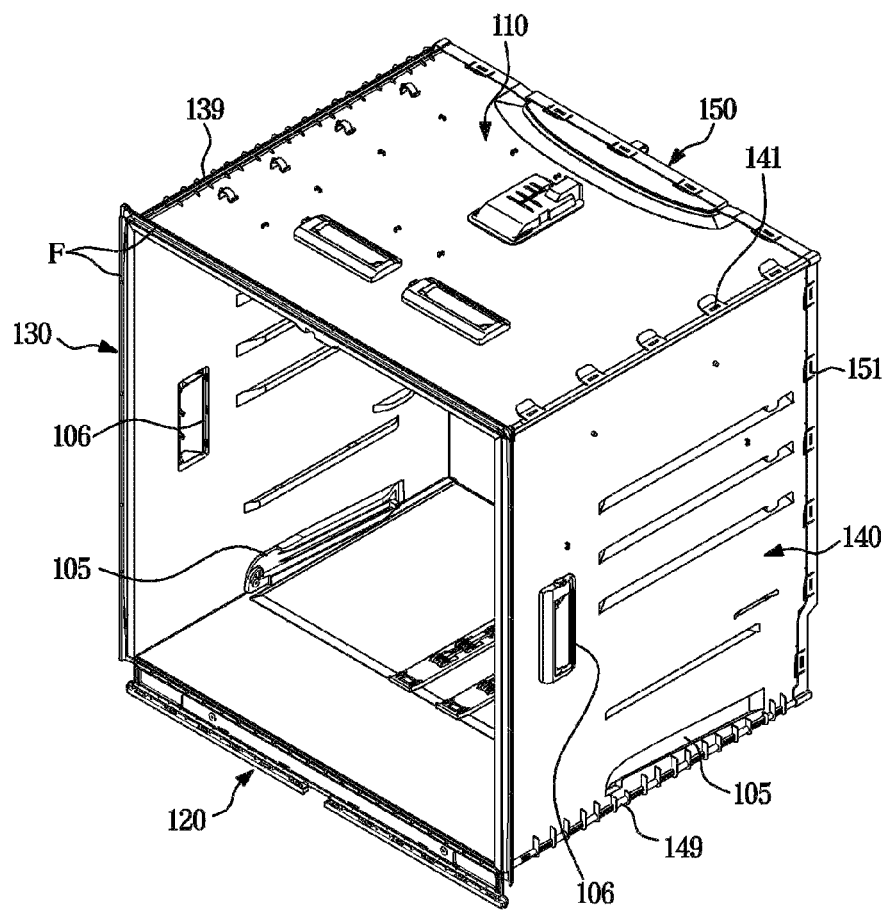
FIG. 31 is a view illustrating a state in which an upper plate, a lower plate, a left plate, and a right plate are assembled to each other according to another embodiment of the present disclosure.

FIG. 30 is a view illustrating a process in which while a lower plate is hinged to a right plate i and an upper plate is hinged to a left plate, remaining parts are hook-coupled according to another embodiment of the present disclosure. FIG. 31 is a view illustrating a state in which an upper plate, a lower plate, a left plate, and a right plate are assembled with each other according to another embodiment of the present disclosure;

Referring to FIGS. 30 to 31, the upper plate 110 and the right plate 140 may be hook-assembled. In addition, the lower plate 120 and the left plate 130 may be hook-assembled. Since the configuration in which the upper plate 110 and the right plate 140 are hook-assembled and the lower plate 120 and the left plate 130 are hook-assembled may be the same as the configuration shown in FIGS. 13 to 20, description thereof will be omitted. In addition, since the configuration in which the rear plate 150 is assembled in a state in which the upper plate 110, the lower plate 120, the left plate 130, and the right plate 140 are assembled may be the same as that shown in FIG. 21, description thereof may be omitted. let it do In the drawings, a French door refrigerator (FDR) type refrigerator is shown as an example, but the disclosure is not limited thereto. That is, the disclosure may be equally applied to an inner case of a top mounted freezer (TMF) or bottom mounted freezer (BMF) type refrigerator in which a refrigerating compartment and a freezing compartment are arranged one on top of another and opened and closed by a single door, a side by side (SBS) refrigerator in which a refrigerating compartment and a freezing compartment are arranged side by side, or a one-door refrigerator having a single storage compartment.

A specific shape and a specific direction of a refrigerator have been described above with reference to the accompanying drawings, but the present disclosure may be variously modified and changed by those skilled in the art, and the modifications and changes should be interpreted as being included in the scope of the present disclosure.

What is claimed is:

1. A refrigerator comprising:
   an inner case assembled by a plurality of plates including an upper plate, a lower plate, a left plate, a right plate, and a rear plate, configured so that, while assembled with each other form a storage compartment, at least one plate among the plurality of plates is injection molded;
   an outer case configured to be coupleable to an outside of the inner case to form an external appearance; and
   a heat insulating material disposed between the inner case and the outer case,
   wherein the at least one injection molded plate among the upper plate, the lower plate, the left plate, and the right plate includes a front flange integrally formed at a front side of the at least one injection molded plate, and
   the outer case is configured to be coupleable to the front flange.

2. The refrigerator of claim 1, wherein each of the upper plate and the lower plate is provided with a plurality of first protrusion portions on left, right, and rear edges, so as to be configured to allow the left plate, the right plate, and the rear plate to be assembled with the upper plate and the lower plate.

3. The refrigerator of claim 2, wherein each of the left plate and the right plate is provided with a plurality of first concave portions on their upper and lower side edges, so as to be configured to be assembled with the plurality of first protrusion portions on the left, right, and rear side edges of the upper plate and the lower plate.

4. The refrigerator of claim 3, wherein each of the left plate and the right plate is provided with a plurality of second protrusion portions on a rear side edge, so as to be configured to be assembled with the rear plate.

5. The refrigerator of claim 4, wherein the rear plate is with a plurality of second concave portions on each side edge, so as to be configured to be assembled with the plurality of first protrusion portions on the rear side edges of the upper plate and the rear side edge of the lower plate and the plurality of second protrusions on the rear side edges of the left plate and the rear side edge of the right plate.

6. The refrigerator of claim 5, wherein the upper plate and the right plate are configured so that, while the upper plate is assembled to the right plate, the upper plate assembled to the right plate is stackable and storable with a plurality of other upper plates assembled to other right plates.

7. The refrigerator of claim 6, wherein the lower plate and the left plate are configured so that, while the lower plate is assembled to the left plate, the lower plate assembled to the left plate is stackable and storable with a plurality of other lower plates assembled to other left plates.

8. The refrigerator of claim 7, wherein the plurality of first protrusion portions on the left side edge of the upper plate are configured to be assembled with the plurality of first concave portions on the upper side edge of the left plate, and the plurality of first protrusion portions on the right side edge of the lower plate are configured to be assembled with the plurality of first concave portions on the lower side edge of the right plate, to allow the upper plate, the lower plate, the left plate, and the right plate be assembled with each other.

9. The refrigerator of claim 8, wherein the plurality of first protrusion portions on the rear side edges of the upper plate and the lower plate and the plurality of second protrusion portions on the rear side edges of the left plate and the right plate are configured to be assembled with the plurality of second concave portions on the rear plate, to allow the rear plate to be assembled with the upper plate, the lower plate, the left plate, and the right plate.

10. The refrigerator of claim 1, wherein a first side of the upper plate is configured to be hinge-assembled with the left plate or the right plate, and a second side opposite the first side of the upper plate is configured to be hook-assembled with the left plate or the right plate.

11. The refrigerator of claim 10, wherein a second side of the lower plate opposite to the first side of the upper plate is configured to be hinge-assembled with the left plate or the right plate, and a first side of the lower plate is configured to be hook-assembled with the left plate or the right plate.

12. The refrigerator of claim 11 wherein the upper plate, the lower plate, the left plate, and the right plate are configured to be hook-assembled with the rear plate.

13. The refrigerator of claim 1, wherein the inner case, while assembled, includes adjacent surfaces that include a protrusion portion that protrudes from one side of the inner case, and a groove portion formed as a recession in an other side to accommodate the protrusion portion.

14. The refrigerator of claim 1, wherein the inner case, while assembled, includes a heat insulating material storage portion configured to store the heat insulating material, wherein the heat insulating material storage portion is located on a path through which a part of the heat insulating material foamed between the inner case and the outer case infiltrates into the storage compartment to prevent the heat insulating material from infiltrating into the storage compartment.

15. The refrigerator of claim 1, wherein the rear plate is provided with an evaporator installation portion configured to accommodate installation of an evaporator, and a drain member detachably coupled to a lower portion of the evaporator installation portion, the drain member configured to drain condensate from the evaporator.

* * * * *